United States Patent
Tanaka

[19]

[11] Patent Number: 5,965,892
[45] Date of Patent: Oct. 12, 1999

[54] THERMAL-TYPE INFRARED IMAGING DEVICE

[75] Inventor: Akio Tanaka, Tokyo, Japan

[73] Assignee: NEC Corporation, Tokyo, Japan

[21] Appl. No.: 08/834,420

[22] Filed: Apr. 16, 1997

[30] Foreign Application Priority Data

Apr. 19, 1996 [JP] Japan ................................. 8-098009

[51] Int. Cl.$^6$ .................................................. H01L 31/09
[52] U.S. Cl. .............................. 250/370.08; 250/338.4; 250/349; 250/332; 348/241
[58] Field of Search ........................... 250/370.08, 338.4, 250/349, 332; 348/241

[56] References Cited

U.S. PATENT DOCUMENTS

| 5,010,251 | 4/1991 | Grinberg et al. | 250/332 |
| 5,650,622 | 7/1997 | Ookawa et al. | 250/332 |
| 5,698,852 | 12/1997 | Tanaka et al. | 250/332 |
| 5,789,753 | 8/1998 | Gouch et al. | 250/349 |

FOREIGN PATENT DOCUMENTS

| 7-87406 | 3/1995 | Japan . |
| 7-193752 | 7/1995 | Japan . |

Primary Examiner—Edward P. Westin
Assistant Examiner—Andrew Israel
Attorney, Agent, or Firm—Young & Thompson

[57] ABSTRACT

A thermal-type infrared imaging device includes a first thermo-electric converting element (101) for generating an electric signal which corresponds to temperature determined according to heat generated by absorbing an incident infrared ray, a first bipolar transistor (102) having its emitted connected to the first thermo-electric converting element (101), and a second bipolar transistor (104) having its collector connected to the collector of the first bipolar transistor (102). The thermal-type infrared imaging device further includes a resistor (103) connected at one end thereof to a power supply and at the other end to the emitter of the second bipolar transistor (104), and an integration capacitor (105) connected to a connecting point of the respective collectors of the first and second bipolar transistors (102 and 104).

25 Claims, 22 Drawing Sheets

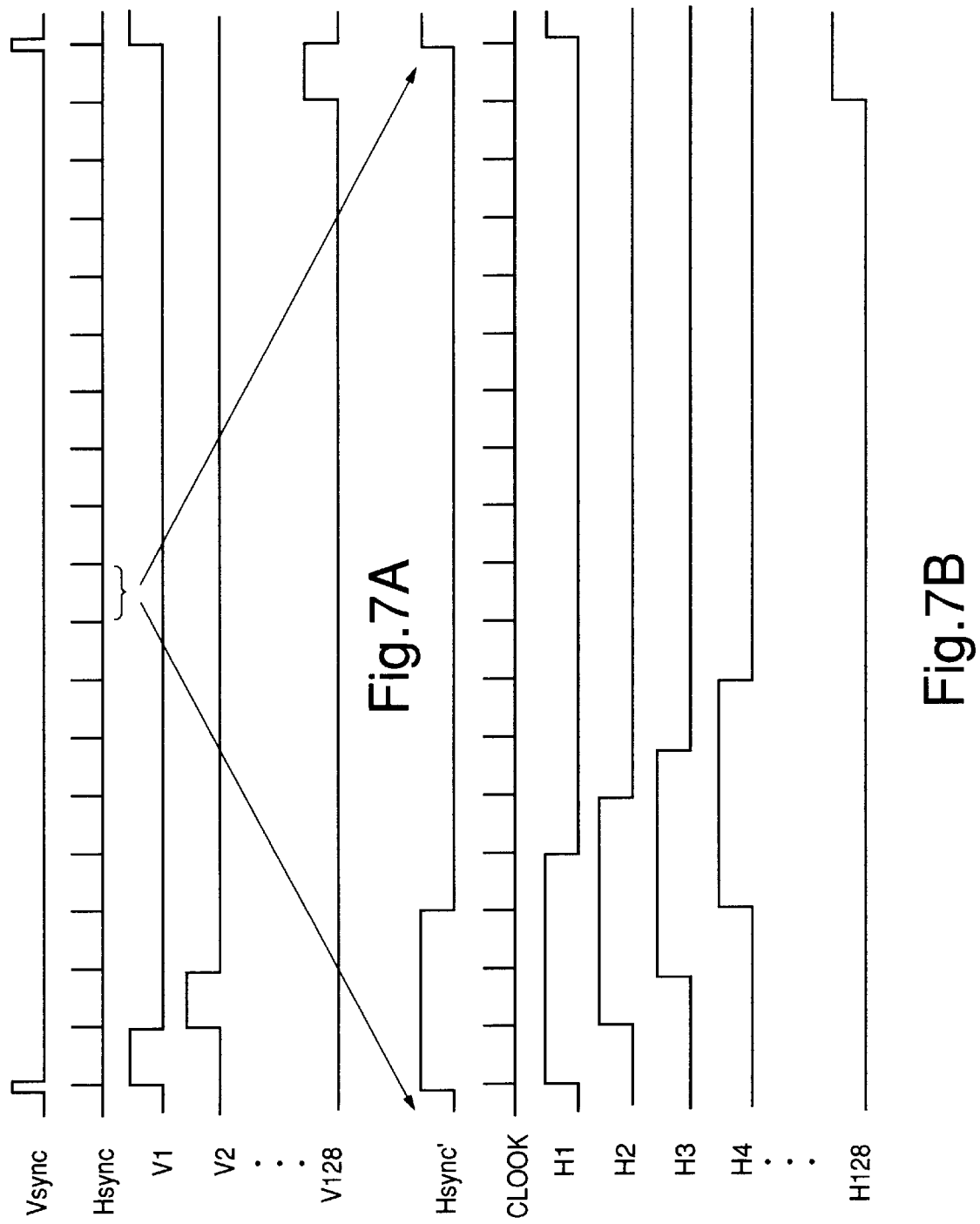

| | V1 | V2 | V3 | VG | VD |
|---|---|---|---|---|---|
| WRITE | 0V | -15V | 15V | -15V | 15V |
| ERASE | 30V | | 0V | 20V | 0V |
| READ | 3V | 0V | ABOUT 8V | 3V | ABOUT 8V |

THERMAL-TYPE INFRARED IMAGING DEVICE

BACKGROUND OF THE INVENTION

The present invention relates to an infrared imaging device, and more particularly to a thermal-type infrared imaging device which detects an incident infrared ray as heat.

The thermal-type infrared imaging device is used, for example, for the purpose of measuring the surface temperature distribution of an object by absorbing infrared rays irradiated from each part of an object and converting them to heat, furthermore converting heat to an electric signal, and displaying the signal as an image.

In the thermal-type infrared imaging device, it is necessary to filter out noise to enhance a signal-to-noise (S/N) ratio and also to make a fluctuation between pixels smaller.

A conventional thermal-type infrared imaging device is described, for example, in Japanese Patent Application Laid-Open No. 7-193752 and Japanese Patent Application No. 6-189144, which are inventions of a prior application of the present inventor.

FIG. 21 shows a sectional view of a conventional thermal-type infrared imaging device, and FIG. 22 shows a plan view of the conventional thermal-type infrared imaging device. The thermal-type infrared imaging device according to the prior application, as shown in FIGS. 21 and 22, has a semiconductor substrate 20 and a scanning circuit 21 on the substrate, and on the scanning circuit 21, has a light receiving section for converting an incident infrared ray to an electric signal.

The light receiving section has a silicon oxide film 22, a cavity 23, a ground wire 24 consisting of aluminum (Al), a signal wire 25 consisting of Al, a slit 26, a titanium bolometer 27, a silicon oxide film 28, titanium nitride 29, and a vertical selection line 30.

The scanning circuit and the light receiving section integrate a plurality of circuits and light receiving sections with respect to a pixel so that a two-dimensional infrared image can be obtainable.

The light receiving section comprises an infrared-ray absorbing layer for absorbing an infrared ray, a diaphragm for preventing escape of heat, and a thermo-electric converting element for converting heat to an electric signal. The diaphragm forms a floating film structure by removing the underlying layer by etching. The thermo-electric converting element in this example employs a bolometer where the electric resistance value varies with temperature and employs titanium as material of the bolometer.

The infrared ray incident on each pixel is absorbed by the infrared-ray absorbing layer of each pixel and causes the temperature of the diaphragm of each pixel to rise. This temperature rise is converted to an electric signal by the titanium bolometer, and the electric signal is output in sequence to an external circuit through the circuit on the substrate. Note that the details of these are described in No. 6-189144.

Objects irradiate an infrared ray having a certain power corresponding to the temperature, based on Plank's equation. For this reason, the infrared imaging device has a large bias component unlike an imaging device for visible light. For example, when the infrared ray of an object of near 300° K. is imaged, there is the need to take out a slight signal component which is above a large bias component irradiated by an object of 300° K.

Furthermore, in the infrared imaging device of the bolometer type, it is necessary that a bias current flows in order to read out a signal. In the infrared imaging device of the bolometer type which operates at normal temperature, the rate of a bias current becomes larger particularly to a signal current and this is also causative of making the bias component larger.

On the other hand, a conventional thermal-type infrared imaging device is provided with a constant current source in addition to a transistor which converts a signal to a current, and a very large bias component is canceled with respect to this signal.

FIG. 23 shows a circuit diagram of the conventional thermal-type infrared imaging device. The thermal-type infrared imaging device has a bolometer 1, a pixel switch 2, a vertical AND element 3, a horizontal switch 4, a horizontal AND element 5, a ground wire 6, a vertical signal line 7, a horizontal signal line 8, a vertical shift register 9, a latch 10, a horizontal register 11, a first output 12, a second output 13, a first integration circuit 14, and a second integration circuit 15. Note that the details of these are described in No. 7-193752.

In addition, in another example an integration capacitor is provided in each pixel. With this, integrating time can be made larger, and the band of noise is narrowed and noise can be reduced (see No. 7-193752). As another example, a quantum-type infrared imaging device is described in Japanese Patent Application Laid-Open No. 7-87406 (Japanese Patent Application No. 5-229946). An integration capacitor is provided in each line so that it can be made larger.

Generally, in the infrared imaging device there exists a fluctuation in the bias level which results from a fluctuation in the detector of each pixel. This is referred to as fixed pattern noise (FPN), and a correction circuit is usually provided to correct the noise. As a conventional example, memory for holding the fluctuation quantity of a bias level is provided exteriorly of an infrared imaging element, and fixed pattern noise is corrected (see No. 6-189144).

Also, in the example of the prior application, the output of a device has an integration transistor, the emitter of the transistor is connected to the output, and the collector is connected to an integration capacitor (see No. 6-189144).

The technique, disclosed in No. 7-193752 of the related application can filter out a large bias component and take out a signal component, but it has the following problems.

In order to integrate the signal of the thermo-electric converting element, there is the need to convert the resistance change or voltage change of the thermo-electric converting element to a change in the current. For this reason, an amplifying element, such as a transistor, or a nonlinear element becomes necessary. However, transistors have noise such as shot noise and Johnson noise regardless of the transistor type such as the bipolar type and the MOS type. In order to improve the S/N ratio, the noise caused by the transistor needs to be made as smaller as possible.

The integration circuit, used in No. 6-189144, has very low noise, but there is no consideration for the aforementioned canceling of the bias component. Even if the techniques of both prior applications were combined with each other, the combination would further have the following problems.

In a thermal-type infrared imaging device using a bolometer, such as that shown in FIG. 22, when the temperature of the device changes, the temperature of the bolometer on the device also changes and therefore the temperature change, as it is, will appear in a signal. For example, when an object with a temperature difference of 1° C. is viewed, the temperature change of the diaphragm is a slight temperature difference of about 0.002° C. and therefore the temperature change (drift) of this device gives a large influence. Therefore, to cope with this, a constant temperature device and a correction circuit become necessary, and in addition, there arises the problem that the dynamic range of a signal is narrowed.

Furthermore, the noise of the circuit, which cancels a bias component, needs to be made as small as possible for an improvement in the S/N ratio. However, in the conventional example there is no consideration for this.

Moreover, the conventional thermal-type infrared imaging device has an integration capacitor for each pixel, so there is a limit to an enlargement in the capacity of a capacitor. For this reason, there arises the problem that the dynamic range of a signal is restricted. On the other hand, there is an example of the quantum type where an integration capacitor is arranged in each column of pixels, but the quantum type, as it is, is not applicable to the thermal-type infrared imaging device.

For an improvement in an S/N ratio, there is the need to make bias current larger. In such a case, the operating voltage of a device is increased. However, a countermeasure in the case has not been considered in the conventional example.

If current flows through a bolometer, the self-heat generation of the bolometer will take place and there will be cases where the dynamic range of a signal will be restricted. However, a countermeasure in the case has not been considered in the conventional example.

The aforementioned fixed pattern noise has the problem that the dynamic range of a signal is narrowed, and therefore, in the conventional example a correction is made, for example, by a correction circuit. However, there arises the problem that the correction circuit requires a large-scale circuit such as an A/D converter and memory.

SUMMARY OF THE INVENTION

Accordingly, it is the object of the present invention to provide a thermal-type infrared imaging device which is capable of making noise sufficiently smaller and the dynamic range of a signal wider and where the circuit structure is simple and a drive method thereof.

A thermal-type infrared imaging device of the present invention comprises a first thermo-electric converting element for generating an electric signal which corresponds to temperature determined according to heat generated by absorbing an incident infrared ray; a first transistor connected between the first thermo-electric converting element and a node; a resistor; a second transistor between connected between the resistor and the node; and an integration capacitor connected to the node.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIGS. 7A–B are timing diagrams showing the embodiment of the thermal-type infrared imaging device of the present invention, FIG. 7A being a diagram showing the output of a vertical shift register and FIG. 7B being a diagram showing the output of a horizontal shift register;

DETAILED DESCRIPTION OF THE PREFERRED EMBODIMENTS

Figure 1:
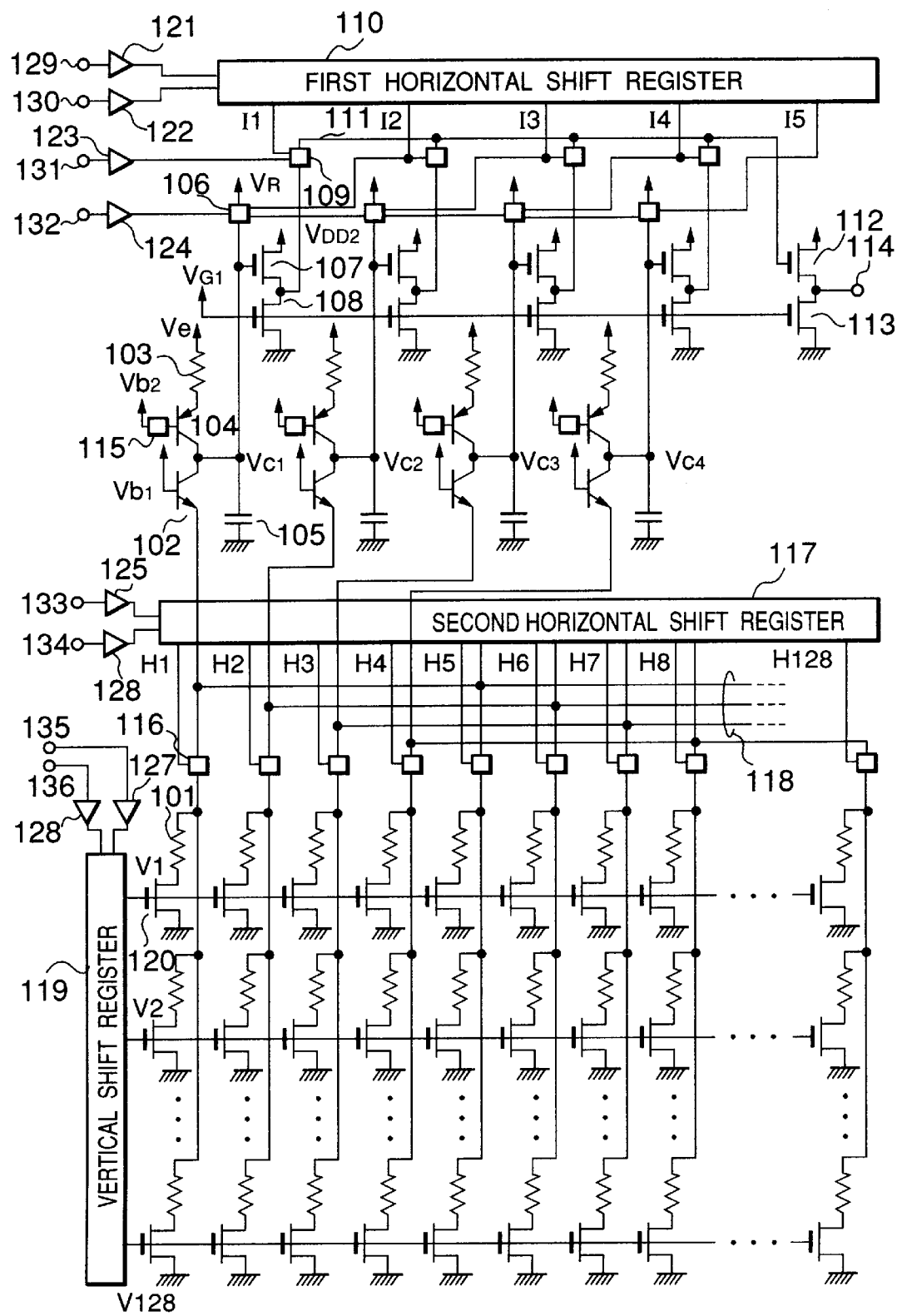
FIG. 1 is a circuit diagram of a thermal-type infrared imaging device showing a first embodiment of the present invention.

As shown in the FIG. 1, a titanium bolometer-1 (101) (on a diaphragm), an NPN transistor 102, a titanium bolometer-2 (103) (on a substrate), a PNP transistor 104, and an integration capacitor 105 are formed on a semiconductor substrate.

The titanium bolometer-1 (101), as with the conventional example, is formed on a diaphragm preventing escape of heat and is sensitive to incident infrared rays. If a voltage of Vb1 is applied to the base of the NPN transistor 102, the base-emitter voltage of the NPN transistor 102 will be made Vbe and a voltage of Vb1—Vbe will be applied to the titanium bolometer-1 (101).

Therefore, if it is assumed that the resistance value of the titanium bolometer-1 (101) is Rb1, a current of $Ic1=(Vb1-Ve)/Rb1$ will flow through the collector of the NPN transistor 102.

The titanium bolometer-2 (103) is formed on a substrate and is insensitive to incident infrared rays. If a voltage of Vb2 is applied to the base of the PNP transistor 104, a current of $Ic2=(Vb2-Vbe)/Rb2$ will flow through the collector of the PNP transistor 104, as in the aforementioned.

Here, Rb2 is the resistance value of the titanium bolometer-2 (103). The reason why the titanium bolometer-2 (103) is formed on a substrate is that it is insensitive to incident infrared rays and that a countermeasure for self-heat generation (which is described later) is considered.

With incident infrared rays blocked, the collector current Ic1 of the NPN transistor 102 and the collector current Ic2 of the PNP transistor 104 are in a state of equilibration, and there is almost no current which flows through the integration capacitor 105.

If infrared rays are incident, the temperature of the thermal isolating diaphragm will rise and the resistance value of the titanium bolometer-1 (101) on the diaphragm will change. This resistance change causes Ic1 to change. However, since the resistance value of the titanium bolometer-2 (103) on the substrate does not change, Ic2 does not change.

By the change in the collector current Ic1, a difference of $\Delta I=(Ic2-Ic1)$ occurs and is accumulated in the integration capacitor 105. This difference ΔI consists of a signal component and a bias component which was not filtered out, and a large bias component has been filtered out.

For example, viewing when a bias current of 1 mA flows, a signal component, when of an object with temperature difference of 1° C., is about 6 nA (when the temperature rise of the diaphragm is 2 m°C. and the temperature coefficient of the bolometer is 0.3%/°C.), which is within 1 mA. Consequently, the effect of filtering out bias current is considerably large.

Although it is usually difficult to completely filter out a bias component due to the fluctuations of Rb1 and Rb2, it is possible to filter out about 99% of the bias component other than 1% which cannot be filtered out due to fluctuations. Therefore, it becomes possible to make an integration capacitor considerably smaller.

For example, in the case where an integration of 4 μsec is performed and the voltage of a capacitor is 5 V, a capacity of 800 pF is required when a bias current is 1 mA. On the other hand, the circuit of the present invention is sufficient with about 8 pF.

In addition, in the thermal-type infrared imaging device of the bolometer type, the S/N ratio is improved in proportion to bias current and in proportion to the root of integration time. That is, the larger the signal component stored in the integration capacitor can be made the more, the S/N ratio will be improved and the meaning of filtering out bias current is large.

Furthermore, in the present invention the titanium bolometer-2 (103) is employed not as a mere resistor but as Rb2. The temperature coefficient of the resistance of this titanium bolometer-2 (103) is made equal to that of the bolometer-1 (101). With this, even if the temperature of the device changed, Rb1 and Rb2 would change at the same rate. Therefore, since Ic1 and Ic2 also change at the same rate by the aforementioned equation, the temperature change of the device can be canceled. On the other hand, when a mere resistor is employed as Rb2, only Ic1 changes by the temperature change of the device and will easily go out of the dynamic range.

Figure 2A:
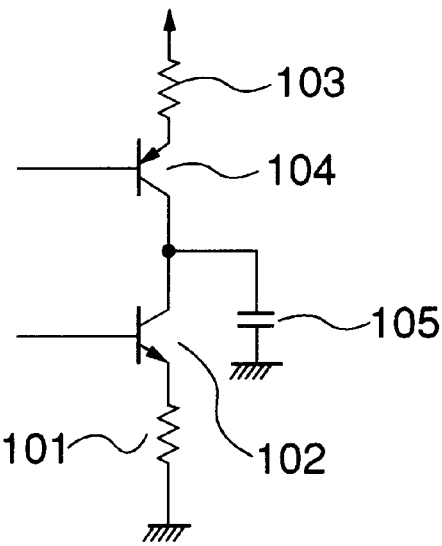
FIGS. 2A–B are circuit diagrams showing the operation of the thermal-type infrared imaging device of the present invention, FIG. 2A being a diagram showing an example of the connection and FIG. 2B being a diagram showing the output current.
Figure 2B:
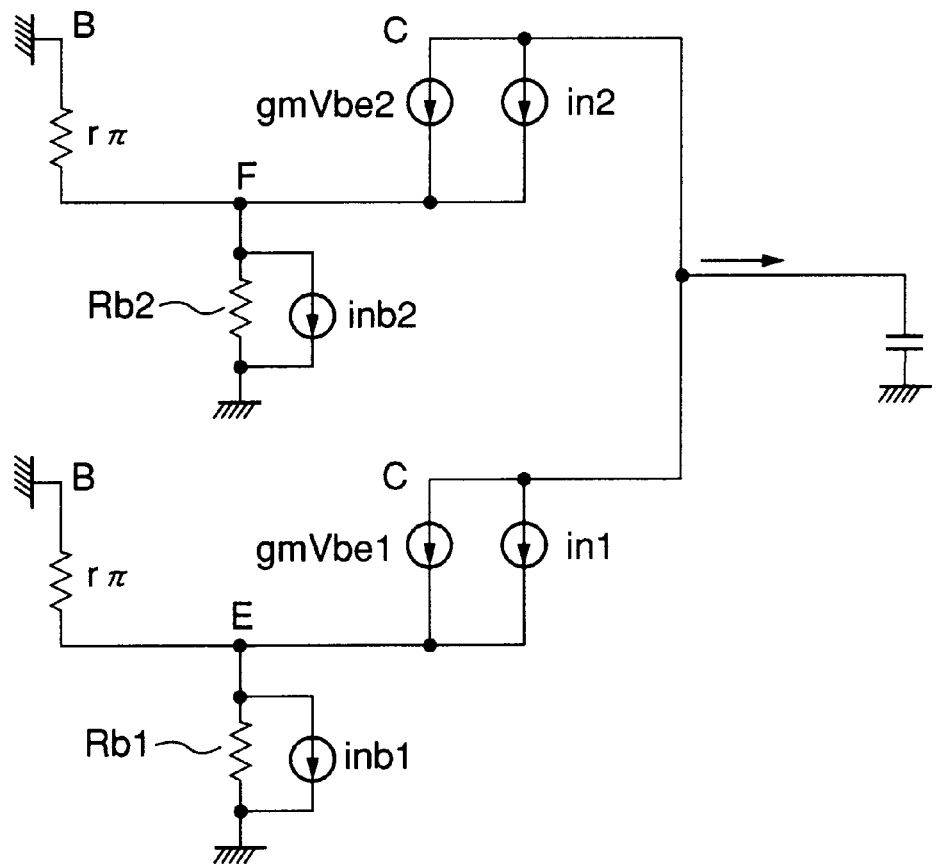

FIG. 2A is a circuit diagram showing the operation of the thermal-type infrared imaging device of the present invention. FIG. 2B shows an equivalent circuit of a compensation circuit consisting of the aforementioned Rb1 (titanium bolometer-1 (101)) and Rb2 (titanium bolometer-2 (103)) and also shows an noise current in.

Bolometers and transistors have various noise such as Johnson noise, shot noise, and 1/f noise. It is a matter of course that the noise of the bolometer itself needs to be made smaller by selecting material, and transistor noise needs to be made smaller than bolometer noise.

In this circuit, the square of noise current (in) flowing through an integration capacitor is expressed by the sum of the square of bolometer noise current inb1, the square of bolometer noise current inb2, the square of transistor noise current in1, and the square of transistor noise current in2 as expressed in the following Eq. (1).

$$in^2 = inb1^2 + inb2^2 + \{in1^2/gm(Rb1//r\pi)\} + \{in2^2/gm(Rb2//r\pi)\} \quad (1) \quad [\text{Eq. 1}]$$

In Eq. (1), the denominator of the transistor noise term contains mutual conductance (gm), bolometer resistance (Rb1 or Rb2), and base-emitter resistance (rπ), and if these values are large, transistor noise will be reduced. Therefore, if mutual conductance (gm), bolometer resistance (Rb1 or Rb2), and base-emitter resistance (rπ) are made larger, transistor noise will be difficult to view. This is considerably effective as a bolometer-type integration circuit.

Generally, since bipolar transistors have a large mutual conductance (gm) and a relatively small 1/f noise, the noise becomes smaller. However, when all circuits are built only by bipolar circuits, there arises the problem that chip area is increased and that consumption power becomes larger.

On the other hand, the mutual conductance (gm) of MOSFETs is small as compared with bipolar transistors, but it is possible to make the mutual conductance (gm) larger either by increasing gate width or by reducing gate length or gate oxide film thickness, and it is possible to employ MOSFETs in an integration circuit.

Generally, MOSFETs have the disadvantage that 1/f noise is large. However, as a countermeasure, either buried-type MOSFETs or junction FETs can be used because the surface of a semiconductor substrate is not used as a channel.

If a bipolar-MOSFET structure is made where bipolar transistors are employed in integration circuit sections and where MOSFETs are employed in sections, such as shift registers, having no relation with noise, the bipolar-MOSFET structure will be slightly complicated in fabrication process but effective. In recent years, the fabrication process of such a BiCMOS structure has been widely used in gate arrays, so it is possible to fabricate the BiCMOS structure at a sufficiently low cost by using the fabrication process. The circuitry shown in FIG. 1 is an example of the case of the BICMOS structure.

As previously described, nearly the same current flows through Rb1 and Rb2 of FIG. 2 so that a bias component is filtered out. However, from the viewpoint of noise, Rb2 exists solely for the purpose of filtering out a bias component, so it is necessary that the noise, generated by Rb2, is made as small as possible.

In order to make the Johnson noise of Rb2 so that it is difficult to view, there is the need to increase the resistance value of Rb2. In that case, it becomes necessary that voltage is raised, because the same current as Rb1 flows through Rb2.

Generally, if noise is increased by about 3 dB, it can be recognized by the naked eye. If Rb2 is 1.5 times Rb1, an increase in the noise will be 2.2 dB, and if the resistance ratio of Rb2 and Rb1 is about two times, an increase in the noise will be about 1.8 dB. Furthermore, if the resistance ratio is about five times, the noise increase will be about 0.8 dB. Instead, the voltage across both ends of Rb2 is considerably increased.

If the resistance ratio is ten times, an increase in the noise will be 0.4 dB and very small but voltage will become very large. For this reason, it is desirable that the value of Rb2 be 1.5 to 10 times Rb1, preferably about 2 to 5 times Rb1.

The integration capacitor 105 of each column in FIG. 1 is read in sequence through the horizontal switch-1 (109). Source followers 107 and load transistors 108 are buffers for sending a signal to a horizontal signal line-1 (111). These buffers can also be omitted. The horizontal shift register-1 (110) selects the horizontal switches-1 (109) in sequence. The voltage of a selected integration capacitor appears on the gate of a source follower 112.

The source follower 112 and load transistor 113 are buffers for sending a signal to an output 114. On the output 114, the voltage of the integration capacitor appears. A reset switch 106 is used to return the voltage of the integration capacitor to a reset voltage of VR after the reading of the integration capacitor. In this example, while the reset switch 106 has been provided in each integration circuit, it is also possible to reset all integration circuits by a single reset switch described later.

In the thermal-type infrared imaging device of the bolometer type, even if integrating time Ts were shortened, the same S/N ratio would be obtainable by making the current Ib flowing through the bolometer larger. The S/N ratio is proportional to the product of Ib and the root of Ts (e.g., Ib√Ts). The quantity Q of electric charges stored in an integration capacitor is the product of Ib and Ts (e.g., Q=Ib·Ts). Therefore, when the same S/N ratio is obtained, Q becomes smaller by making Ib larger and Ts smaller, and the capacity of the integration capacitor can be made smaller. Therefore, in some cases, arranging a single integration capacitor in each column or a plurality of columns shortens the integrating time but is more beneficial than the case where integration capacitors are arranged on pixels disposed in the form of a matrix to increase the integrating time.

For example, when an integration capacitor is arranged in each column and an integration of about 4 μsec is performed, only a capacity of about 8 pF is needed with a bias current of 1 mA and a bias component filtering-out rate of 99%. When an integration capacitor is arranged in each pixel and an integration of about 33 msec is performed, a bias current of about 11 μA becomes necessary for obtaining the same S/N ratio and a capacity of as much as 700 pF becomes necessary with the same bias component filtering-out rate.

In the example of FIG. 1, a single integration circuit is provided in a plurality of columns, and the single integration circuit is constituted by the aforementioned NPN transistor 102, titanium bolometer-2 (103), PNP transistor 104, and integration capacitor 105. In this case, the integrating time becomes smaller than in the case where an integration circuit is provided in each pixel, but the same S/N ratio is obtainable by increasing Ib. Furthermore, only a single capacitor, which is smaller in capacity than the capacitor provided in each pixel, needs to be provided in a plurality of columns and therefore chip size can be considerably reduced. Thus, the shorter the integrating time is, the smaller an integration capacitor can be made smaller, but if Ib becomes larger, another problem will arise.

As previously described, bolometers and transistors have Johnson noise, shot noise, and 1/f noise. Among these, the 1/f noise becomes larger in proportion to Ib. Therefore, if 1/f becomes dominant, the effect of an improvement in the S/N ratio will be diminished. Therefore, there is a limit to shortening of the integrating time, that is, the integrating time can be shortened until 1/f noise becomes dominant due to an increased Ib.

The value of Ib at which the 1/f noise becomes dominant depends on the material used in a bolometer. When a titanium bolometer of about 3 KΩ is employed, the limit is, for example, about 3 mA, and this value is considerably changed, for example, by the film thickness configuration of a bolometer. In the present invention, various structures will be described later so that they can correspond to various integration times.

In order to have a single integration circuit for a plurality of columns, the present invention has two pairs of a horizontal switch and a horizontal shift register. One of the two pairs comprises a horizontal switch-1 (109) and a horizontal shift register-1 (110) for selecting the aforementioned integration capacitor. The other pair comprises a horizontal switch-2 (116) and a horizontal shift register-2 (117) for selecting each column of pixels arranged in the form of a matrix.

FIG. 1 is an example where 4 integration circuits are arranged for 128 columns of pixels, and a single integration circuit is provided for 32 columns. The horizontal switch-2 (116) and the horizontal shift register-2 (117) select 128 columns in sequence, and the selected columns are allocated to four horizontal signal lines-2 (118). The four horizontal signal lines-2 (118) are connected to independent integration circuits, respectively.

A pixel switch 120 is arranged in each pixel for selecting the titanium bolometer 101 of each pixel. A vertical shift register 119 controls the pixel switch 120 to select each row. For example, in the case of 128 rows of pixels, the vertical shift register 119 has 128 steps. While the vertical shift register 119 is selecting a certain row, the horizontal shift register-2 (117) selects each column and integration operation is performed by the integration circuit corresponding to the selected column. The result of the integration operation is transferred to the output 114.

While the foregoing description has been made of the case where four integration circuits are provided for 128×128 pixels and where a single integration circuit is provided for 32 columns, it is possible to increase the number of pixels and the number of integration circuits to any number. However, since integrating time is determined by (frame time)/(number of rows)/(number of column connected to an integration circuit), the number of integration circuits must be determined according to the number of rows, the number of columns, and integrating time. Since the horizontal shift register-1 (110) is also used to read the integration circuits, the present invention can easily cope with an increase in the number of integration circuits only by increasing the number of the steps of the horizontal shift register-1 (110).

Figure 3:
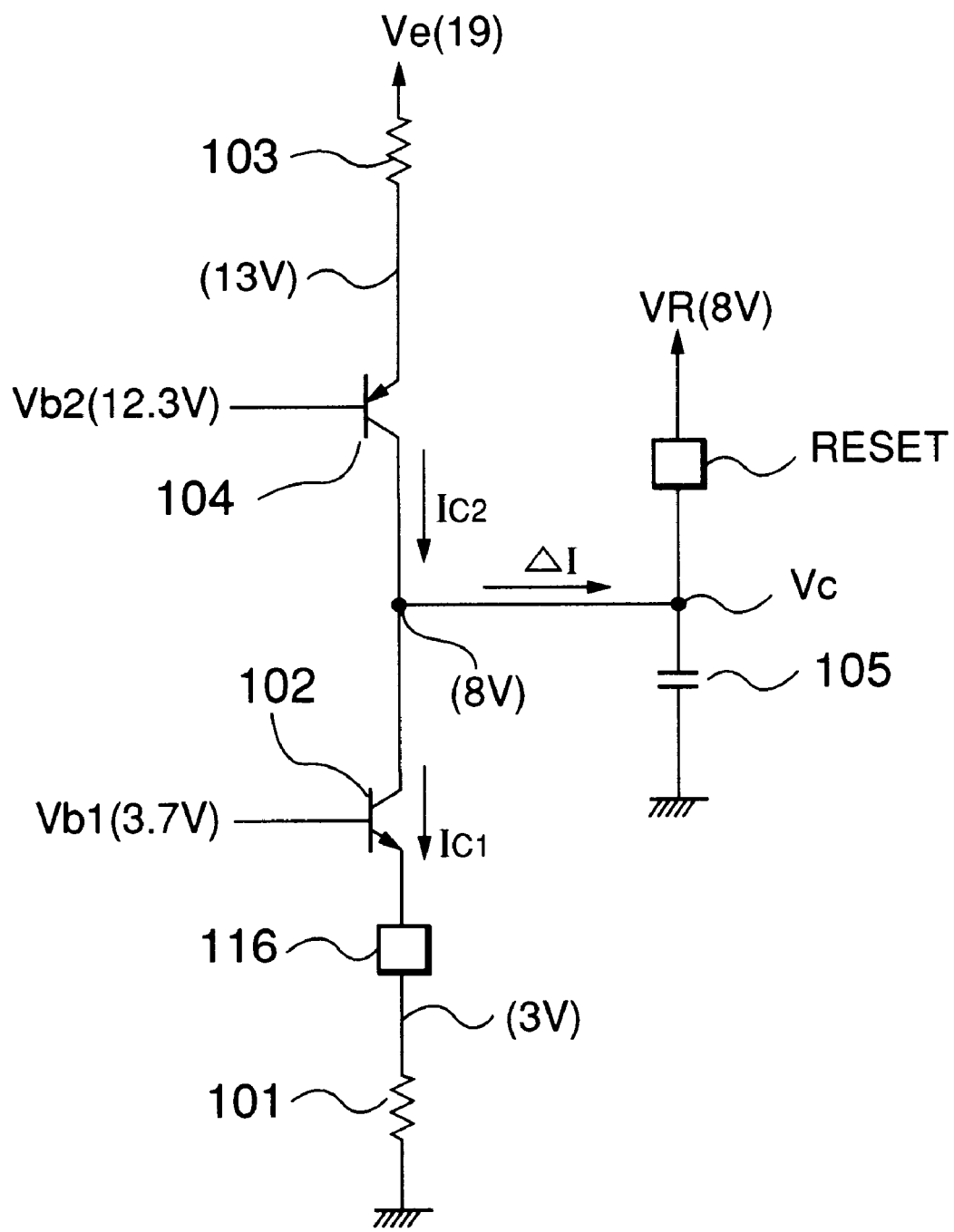
FIG. 3 is a circuit diagram showing the operation of the thermal-type infrared imaging device of the present invention.

FIG. 3 is a circuit diagram showing the operation of the thermal-type infrared imaging device of the present invention and shows only the integration circuit section of FIG. 1. The voltage on each section of FIG. 1 is set, for example, as follows.

When a current of 1 mA flows through the titanium bolometer 101, the emitter voltage of the NPN transistor 102 becomes 3 V with the resistance of the bolometer-1 (101) as 3 KΩ. At this time, the base voltage Vb1 of the NPN transistor 102 becomes about 3.7 V with Vbe as 0.7 V.

The collector of the NPN transistor (102) is connected to the integration capacitor 105. During integration, the voltage on this section changes with respect to the operating point. During this change, the NPN transistor needs to perform a constant current operation, and for this reason, the operating point is set to 8 V which is higher than the emitter voltage (3 V), for example, by about 5 V. The emitter voltage of the PNP transistor 104 is also set to 13V which is about 5 V higher than the operating point (8 V), for the same reason.

The base voltage Vb2 becomes 12.3 V with Vbe as 0.7 V. When the resistance of the titanium bolometer-2 (103) is set, for example, to 6 KΩ which is two times the resistance of the titanium bolometer-1 (101), for the aforementioned reason on noise, Ve is set to 19 V so that a current of 1 mA can flow through the titanium bolometer-2 (103).

While the foregoing description has been made of the case where it is assumed that Vb1 and Vb2 are constant, the following problems other than this will arise. Since the titanium bolometer-1 (101) has been formed on a thermal isolating diaphragm, the titanium bolometer-1 (101) will give rise to temperature rise by Joule heat, if current flows through the titanium bolometer-1 (101). This temperature rise depends upon a current flowing through the bolometer-1, but in some cases, the temperature gets up to a few ten °C. The temperature rise will change the resistance value of the bolometer by a few percent.

Since the titanium bolometer-2 (103) is formed on a substrate, the bolometer is not influenced by the current Ic2 flowing through the bolometer. Each time each row is selected, the titanium bolometer-2 (103) is used for bias cancellation. Therefore, unless it is thus formed on a substrate, self-generation of heat will be considerably large. For this reason, during integration operation, Ic2 is constant but Ic1 is reduced. Consequently, a bias component will not be canceled.

Figure 4A:
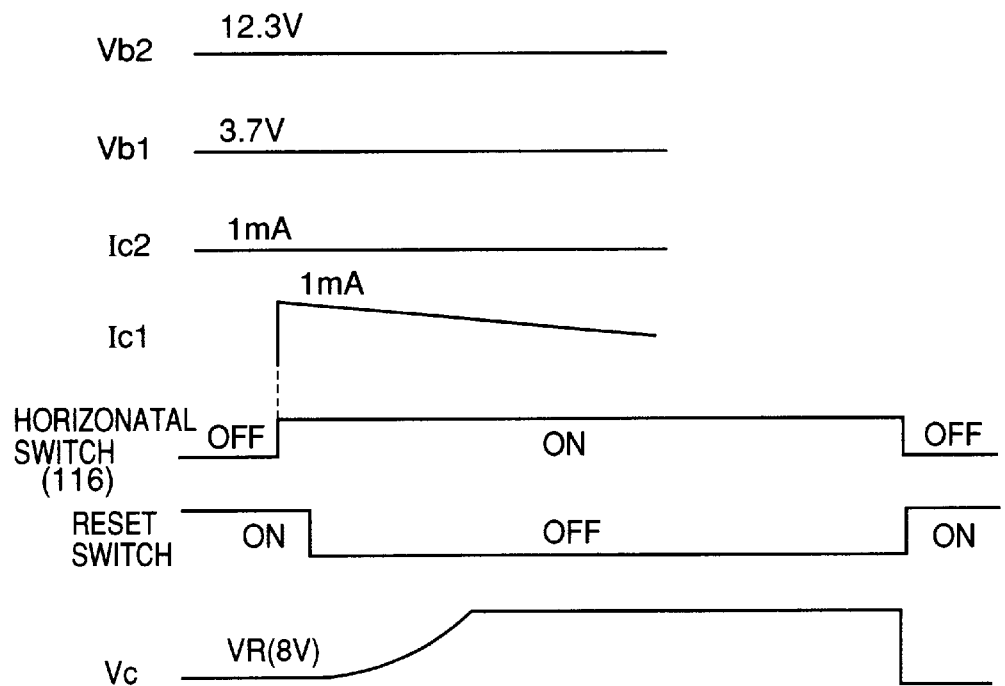
FIGS. 4A–B are timing diagrams showing the operation of the thermal-type infrared imaging device of the present invention, FIG. 4A being a diagram showing an example where the voltage across both ends of a capacitor has been saturated during integration and FIG. 4B being a diagram showing the state when a ramp waveform (Vb2) was input.

FIG. 4 is a timing diagram of the operation of the thermal-type infrared imaging device of the present invention, and FIG. 4A shows the temporal change of a bias component and also shows that the voltage across both ends of a capacitor has been saturated during integration without cancellation of the bias component.

Figure 4B:
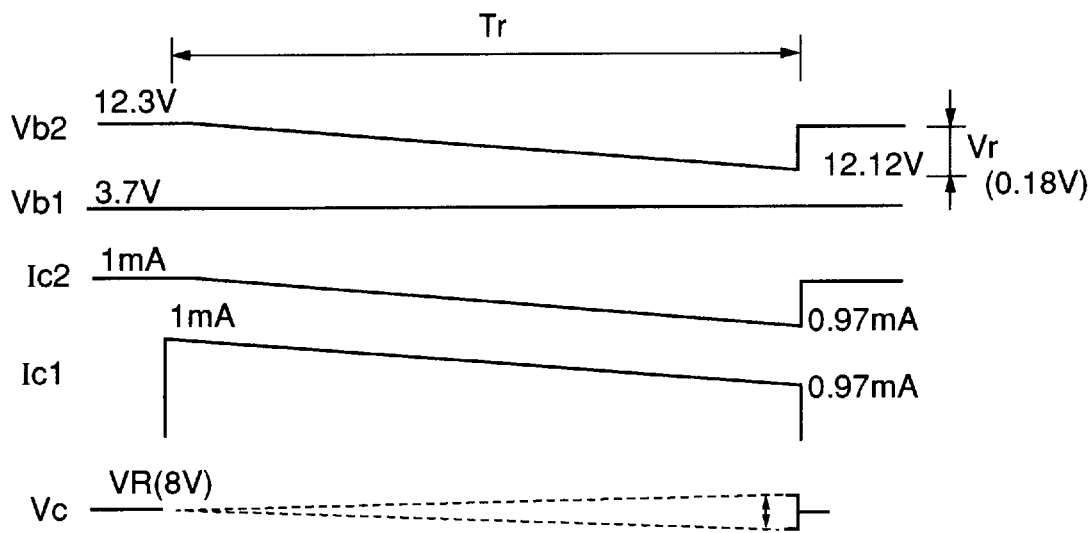

To cope with this, the present invention inputs a ramp waveform, such as that shown in Vb2 of FIG. 4B, to the base of the PNP transistor 104, and cancels the change of Ic1 caused due to temperature rise by purposely changing Ic2.

For example, when it is assumed that the peak of the self-heat generation of the bolometer is 10° C. and that the temperature coefficient of the bolometer is 0.3%/°C., the resistance value of the bolometer rises by 3% and Ic1 is reduced by 3%. Usually, since the thermal time constant of a diaphragm is considerably greater than integrating time, this temperature rise will be almost linear with respect to time. The voltage across both ends of Rb2 is 6 V. Therefore, if a ramp waveform is input which linearly changes by 0.18 V (6 V×3%) between 12.3 V and 12.12 V like Vb2 of FIG. 4B, Ic2 also changes by 3% and therefore the change of Ic1 can be canceled. Reference numeral 115 of FIG. 1 denotes a ramp waveform generator which performs such operation.

Figure 5A:
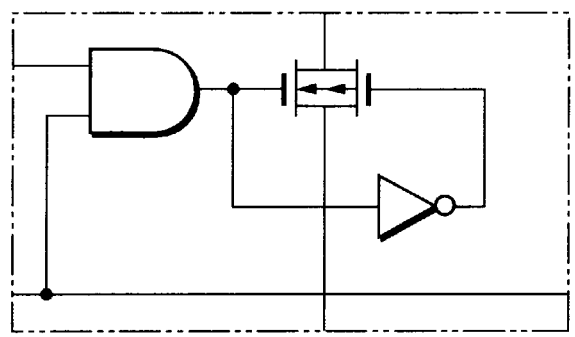
FIGS. 5A–C are circuit diagrams showing a circuit structure example of each section in an embodiment of the thermal-type infrared imaging device of the present invention, FIG. 5A being a diagram showing a circuit example of a horizontal switch, FIG. 5B being a diagram showing a circuit example of a reset switch, and FIG. 5C being a diagram showing a circuit example of a ramp waveform generator.
Figure 5B:
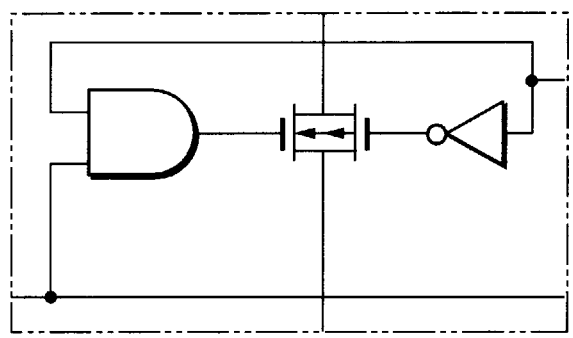

FIGS. 5A–B show circuit examples of the horizontal switch-1 (109) and the reset switch 106. In these circuits, a pulse for controlling the switches must have a voltage which is equal to or greater than that of a signal passing through the switches. In such a case, if there is no level converter, the dynamic range will be restricted.

Figure 5C:
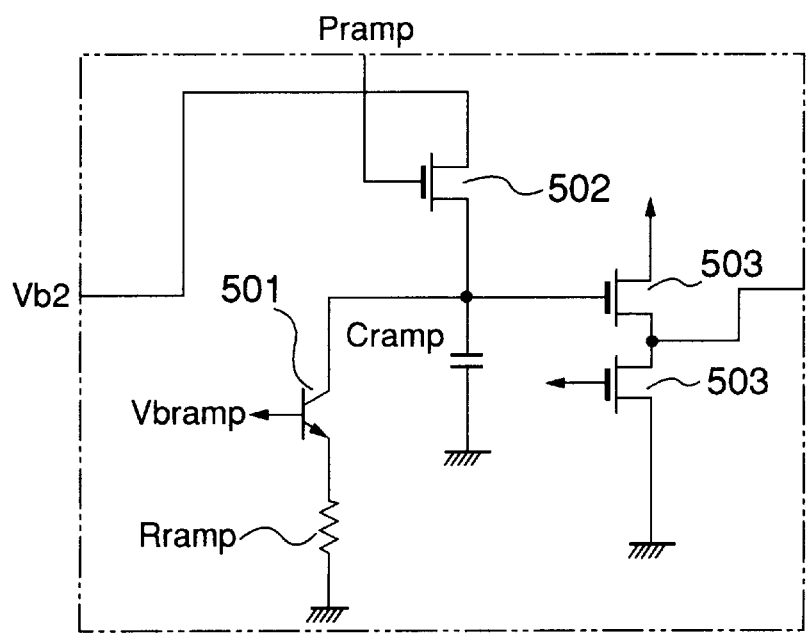

As shown in FIG. 5C, the ramp waveform generator comprises an NPN transistor 501, a resistor $R_{ramp}$, a capacitor $C_{ramp}$, a P-type MOSFET 502, and a buffer 503.

Vb2 is given a voltage (12.3V) which is the maximum value of a ramp waveform. The voltage $Vb_{ramp}$, which is given to the base of the NPN transistor 501, is set so that $Vb_{ramp} = C_{ramp} \cdot R_{ramp} \cdot Vr/Tr + Vbe$ (Vbe is about 0.7 V). In this equation, Tr represents the interval of the ramp waveform and Vr represents the ramp voltage.

Also, $Vb_{ramp} < Vb2$ must be set so that the NPN transistor 501 performs a constant current operation. The ramp voltage Vr is set to a voltage (0.18 V) that the voltage across both ends of the titanium bolometer-2 (103) changes by the aforementioned 3%.

$P_{ramp}$ of FIG. 5C is a pulse which controls the P-type MOSFET 502, and gives a pulse so that the P-type MOSFET 502 is turned on at the same timing as the horizontal switch-2 (116) is turned on.

Since the output of the ramp waveform generator 115 is input to the base of the PNP transistor 104, attention must be given to the noise of this circuit. The resistance value of $R_{ramp}$ has to be selected so that the Johnson noise is sufficiently reduced with respect to the titanium bolometer-1 (101) or the titanium bolometer-2 (103).

The Johnson noise of $R_{ramp}$ appears as a noise current flowing through the integration capacitor 105, and the gain is expressed by $Tr/(C_{ramp} \cdot Rb2)$. Of course it is preferable that the gain be smaller. In order to make the manner, in which the Johnson noise of this $R_{ramp}$ appears, equal to or less than that of the titanium bolometer Rb, the following Eqs. (2) and (3) must be satisfied. In Eq. (2), k is Boltzmann's constant and T is the absolute temperature.

$$4kT/Rb \geq (Tr/C_{ramp}/Rb2)^2 \cdot 4kT/R_{ramp} \quad \text{(Eq. 2)}$$

$$R_{ramp} \leq Rb2 \cdot (Vb_{ramp}/Vr)^2 \quad \text{(Eq. 3)}$$

In this case, the following Eq. (4) is obtained.

$$C_{ramp} = Vb_{ramp} \cdot Tr/(Vr \cdot R_{ramp}) \quad \text{(Eq. 4)}$$

For this reason, as long as $R_{ramp}$ satisfies Eq. (3), a larger $R_{ramp}$ can make $C_{ramp}$ smaller. Now, it is assumed that Rb2 is 6 kΩ, $Vb_{ramp}$ is 10 V, and Vr is 0.18 V. From Eq. (3), the upper limit of $R_{ramp}$ is 18.5 MΩ. If Tr is set to 4 μsec, $C_{ramp}$ will be 12 pF from Eq. (4). The capacity of this level can be easily made within an integrated circuit.

While the foregoing description has been made of the ramp waveform generator 115 connected to the base of the PNP transistor 104, it is also possible to connect the ramp waveform generator to the base of the NPN transistor 102. In this case, the set voltage in each section changes.

In the present invention, as previously described, the voltage of each section is increased in order to make bias current larger. For this reason, there is the need to raise the operating voltage of the circuitry on the device, so the present invention is provided with a level converter. In FIG. 1, 121 through 128 constitute this level converter.

Usually, the timing circuit on the periphery of the device, which supplies timing to the device, is constituted by a logic IC of a 5V system. However, as previously described, the horizontal switch-1 (109), for example, handles a high voltage (13 V), such as operating point (8 V)+dynamic range (5 V).

Figure 6A:
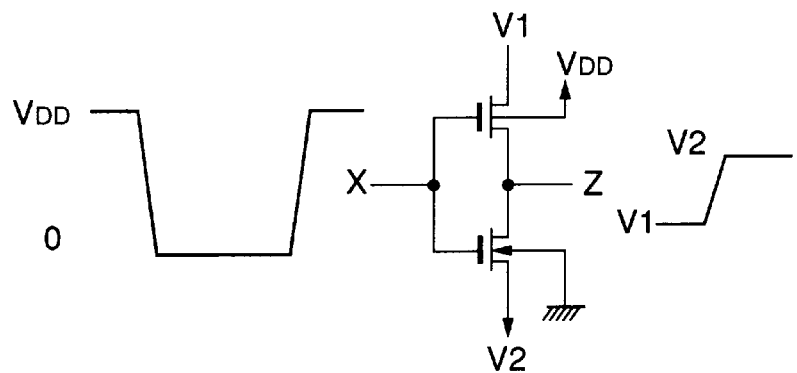
FIGS. 6A–C are circuit diagrams showing a circuit structure example of each section in the embodiment of the thermal-type infrared imaging device of the present invention, FIG. 6A showing an example which converts a logic level voltage (e.g., 5 V) to a voltage (e.g., 3.7 V) required of an integration transistor, FIG. 6B showing an example which converts a logic level voltage to a voltage (e.g., 13 V) required of a horizontal shift register, FIG. 6C showing an example which converts a logic level voltage to voltages (e.g., a gate voltage of 12V and an OFF-voltage of 19V)

FIG. 6 is a circuit diagram (2) showing a circuit structure example of each section in the embodiment of the thermal-type infrared imaging device of the present invention.

Figure 6B:
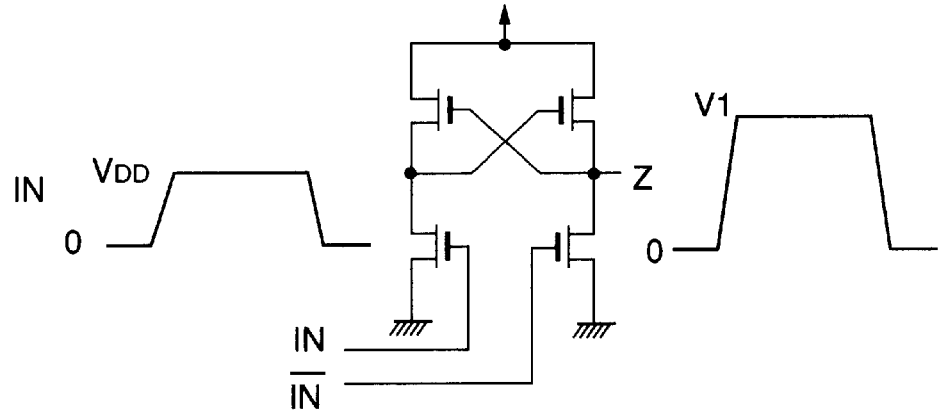
Figure 6C:
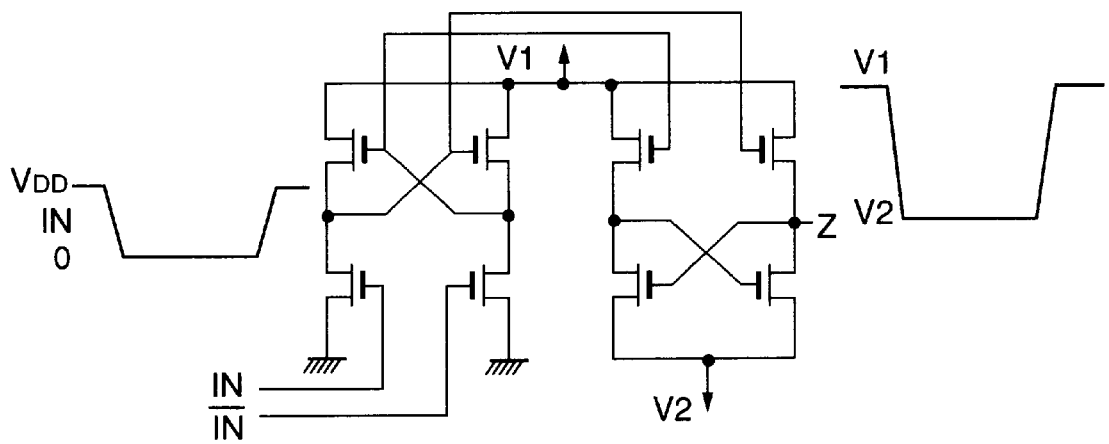

In FIG. 1, in order to give a high-voltage pulse to the horizontal switch-1 (109), it is assumed that the horizontal shift register-1 (110) is also operated at this high voltage (13 V). At this time, a horizontal data input-1 (129) and a horizontal clock input-1 (130) require the level converter (121, 122). VDD of FIG. 6(b) is set to an input logic amplitude (e.g., 5 V) and V1 is set to a necessary high voltage (e.g., 13 V).

Therefore, an input control pulse of 5V system is converted to a high voltage (13 V) by the level converters 121 and 122 and is input to the horizontal shift register-1 (110) that operates at 13 V. The horizontal shift register-1 (110) selects the high voltage (13 V) in sequence and gives the horizontal switch-1 (109) the selected high voltage.

While it has been described that the level converter is arranged in the input section of the device, it is also possible to arrange the level converter interiorly of the device. For example, by arranging the level converter between the horizontal shift register-1 (110) and each of the horizontal shift registers-1 (109), the same objective can be achieved. In this case, since the horizontal shift register 110 does not need to be operated at high voltage, a low voltage circuit can be used and a high-speed and low-power operation can be performed.

However, since the level converter is arranged before each of the horizontal switches, there are cases where chip area is increased. In the example of FIG. 1, although the level converter has been arranged in each input section, it can be omitted depending upon a voltage that is operated.

FIG. 7 is a timing diagram showing the embodiment of the thermal-type infrared imaging device of the present invention, and shows the drive timing of the circuit structure of FIG. 1.

Since the vertical shift register 119 of FIG. 1 sequentially selects each row, $V_{sync}$ is input as vertical data 135 and $H_{sync}$ is input as vertical clock 136. $V_{sync}$ is made so that a pulse is output at intervals of 33 msec, for example, in the case of a frame frequency of 30 Hz. $H_{sync}$ is made so that a pulse is output at intervals of about 250 μsec (33 m/128), for example, in the case of 128 rows. The outputs V1, V2, . . . , and V128 of the vertical shift register 119 are shown in FIG. 127. With this, each row can be sequentially selected.

While a certain row is being selected, the horizontal shift register-2 (117) selects each column in sequence. A $H_{sync}'$ signal and a CLOCK signal are input to the horizontal data-2 (133) and the horizontal clock-2 (134), respectively. As previously described, the vertical shift register 119 selects each row by the $H_{sync}$ signal, and at this time, there are cases where there is a delay until the pixel switch 120 is completely turned on. For this reason, there are cases where it becomes necessary to delay the $H_{sync}'$ signal, for selecting each column, with respect to the $H_{sync}$ signal. The outputs H1, H2, . . . , and H128 of the horizontal shift register-2 (117) are shown in FIG. 7.

As previously described, the embodiment of FIG. 1 has four integration circuits, and these four integration circuits are independently operated. Therefore, it is a matter of course that the respective integration operations can be performed at the same time. However, when respective integrations are perfectly performed at the same time, it is necessary to either read an output from each integration circuit at the same time or temporarily store a signal and sequentially read it. In the case where outputs are read out at the same time, the outputs corresponding in number to the integration circuits are needed.

If a great number of outputs are provided, the external circuit will be complicated, and furthermore, there will arise the problem that the drift between outputs will be increased. Also, in the case where a signal is temporarily stored, signal holding time varies between four integration circuits and this is also causative of a level difference between four signals.

In the present invention, as shown in FIG. 7, integration intervals are shifted little by little between integration circuits so that signals can be read out in sequence. With this, the reading of a signal from an integration circuit can be performed at a single point, the output 114.

Figure 8:
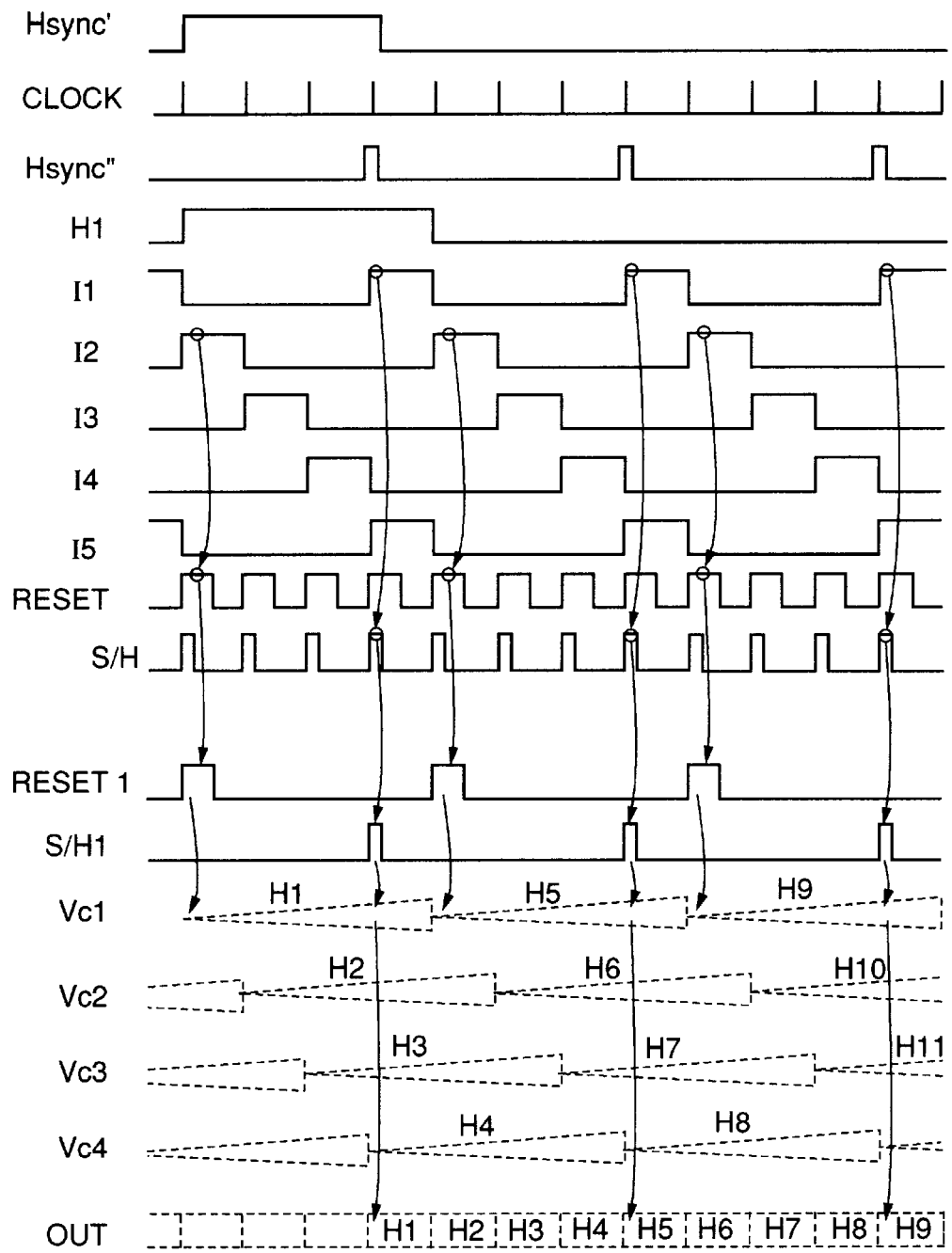
FIG. 8 is a timing diagram showing the embodiment of the thermal-type infrared imaging device of the present invention.

FIG. 8 is a timing diagram showing the embodiment of the thermal-type infrared imaging device of the present invention, and shows operations of four integration circuits in detail.

The horizontal shift register-1 (110) is used to select each integration circuit, as previously described, and the $H_{sync}'$ signal and the CLOCK signal of FIG. 8 are input to the horizontal data-1 (129) and the horizontal clock-1 (130), respectively. With this, integration circuit selection pulses I1 through I5 are output from the horizontal shift register-1 (110).

Taking the leftmost integration circuit of FIG. 1 as an example, an integrating operation will be described. The leftmost integration circuit is connected to one of the horizontal signal lines 118. The signal line is connected in sequence every four columns like the first column (H1), the fifth column (H5), the ninth column (H9), . . . , by the horizontal shift register-2 (117). Each column is connected to a single pixel selected by the vertical shift register 119.

The timing of the first column H1 and the output voltage Vc1 of the leftmost integration circuit are shown in FIG. 8. During the high level of the timing of H1, an integration operation of H1 is performed and the integrated waveform appears on Vc1. This integrated waveform is different in gradient, depending upon the size of incident infrared rays and a fluctuation in the cancellation of a bias current.

The component other than incident infrared rays can be filtered out by the aforementioned conventional fixed pattern filtering-out method. This Vc1 is selected by the aforementioned pulse I1 and is transferred to the horizontal signal line-1 (111), and finally it appears on the output 114.

At this time, since there is the need to sample and hold the voltage of the vicinity of the end of the integrated waveform (triangle wave) of Vc1, an S/H1 pulse is made by computing a logic sum (AND) between I1 and an S/H pulse, as shown in FIG. 8. At this timing, the horizontal switch-1 (109) is turned on. Also, at the beginning of the integration operation, a RESET-1 pulse of FIG. 8 is given to the reset switch 106 to reset the voltage of the integration capacitor 105. The RESET-1 pulse is made by computing a logic sum (AND) between the next pulse I2 of I1 and the RESET pulse.

Thereafter, Vc1 sequentially performs integrations of H5, H9, . . . Vc2 through Vc4 also perform integration operations sequentially in parallel, but the integration operations are slightly delayed with one another. Here, I5 exists for making the reset pulse of Vc4 and is exactly the same pulse as I1, so I1 may be used. However, since I1 and Vc4 are away from each other on the device and furthermore since fluctuation becomes smaller if they are arranged on the same integration circuit, it is desirable to use I5.

Thus, in the present invention, integration start times are shifted little by little for a plurality of integration capacitors, the reading of an integrated value is performed by time series for each integration capacitor, and the time between the end of integration and the reading is made constant for a plurality of capacitors. With this arrangement, integrations can be performed in parallel. In addition, integrating time can be lengthened with a less number of integration circuits, and the aforementioned fluctuation or drift can be minimized between integration circuits.

Figure 9:
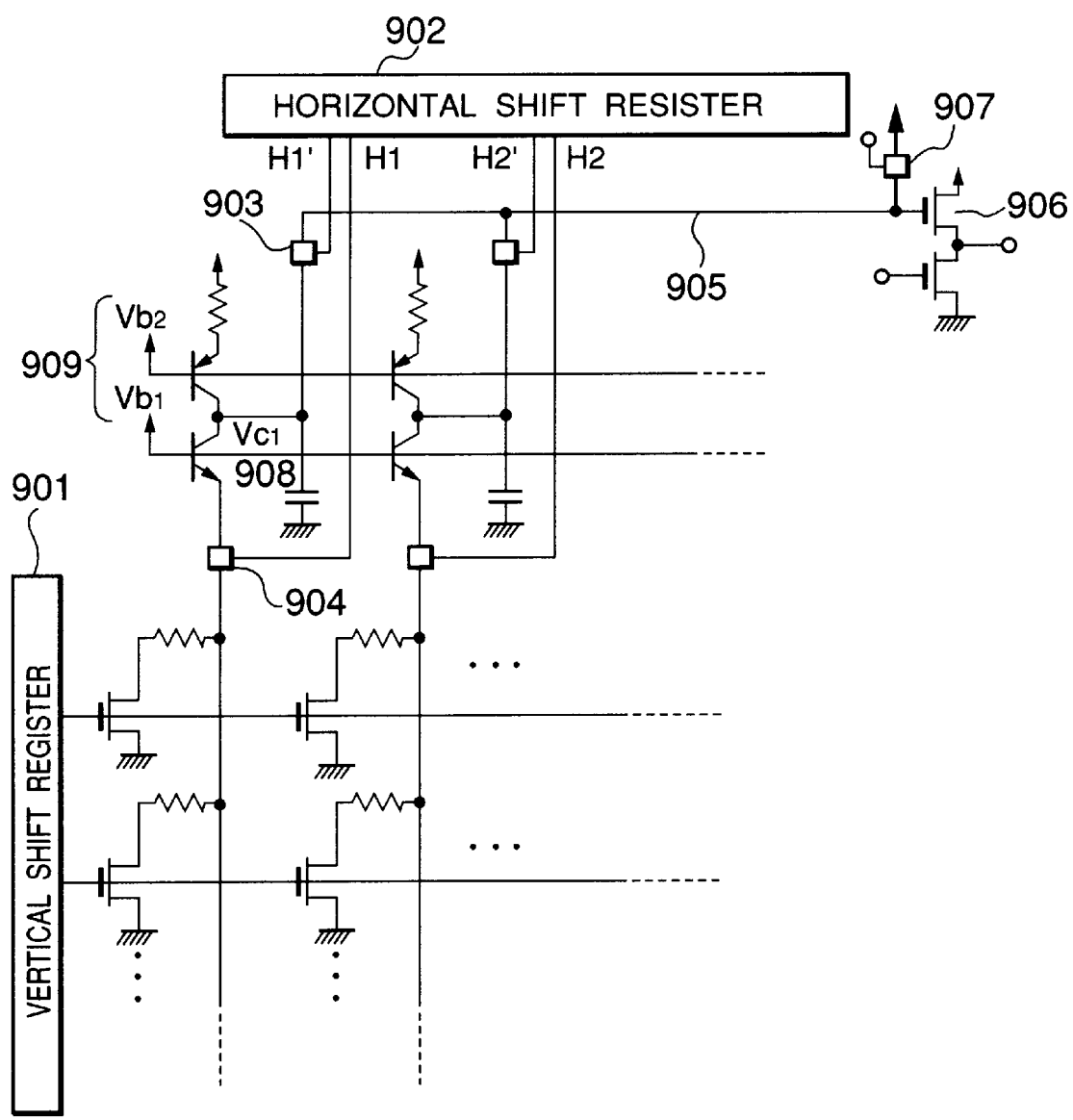
FIG. 9 is a circuit diagram showing a circuit structure example of each section in the second embodiment of the thermal-type infrared imaging device of the present invention.

FIG. 9 is a circuit diagram showing a circuit structure example of each section in the second embodiment of the thermal-type infrared imaging device of the present invention, and shows an example of the integration circuit arranged in each column. Depending upon integrating time, there are cases where it is desirable to arrange an integration circuit in each column. This arrangement is effective when the number of pixels is increased, particularly like 1000× 1000 pixels.

The circuit, shown in FIG. 9, has a vertical shift register 901, a horizontal shift register 902, a horizontal switch-1 (903), a horizontal switch-2 (904), an integration circuit 909, and so on. In this case, only a single horizontal shift register is needed.

Figure 10:
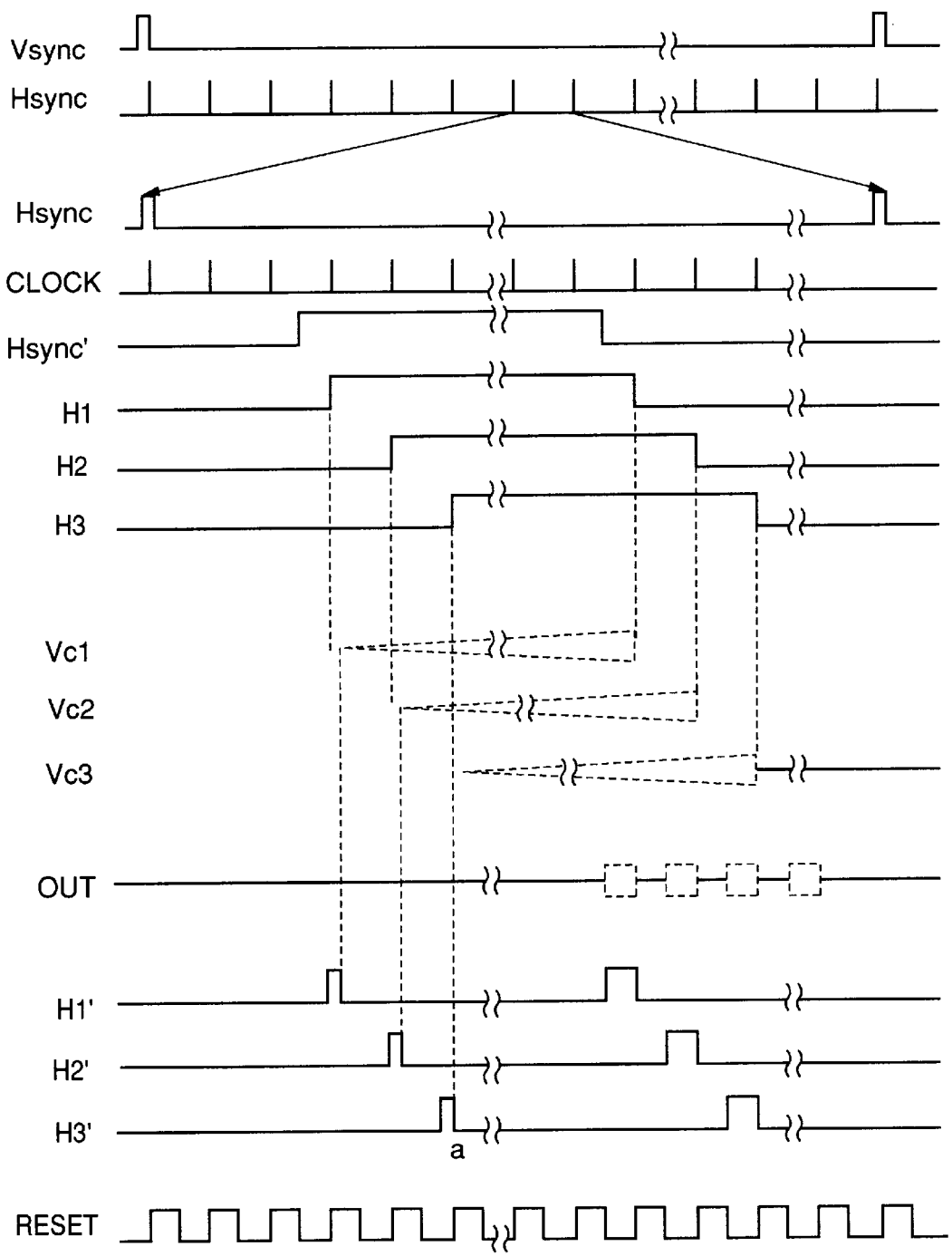
FIG. 10 provides timing diagrams showing the second embodiment of the thermal-type infrared imaging device of the present invention, FIG. 10 being a diagram showing the relation between $V_{sync}$ and $H_{sync}$ and further being a diagram showing the relation between $H_{sync}$ and $H_{sync}'$.

FIG. 10 is a timing diagram showing the embodiment of the thermal-type infrared imaging device of the present invention, and shows the operation of the circuit shown in FIG. 9.

In FIG. 9, the $V_{sync}$ and the $H_{sync}$ of FIG. 10 are input to the data input and the CLOCK input of the vertical shift register 901, respectively, and each row is sequentially selected. The $H_{sync}'$ and the CLOCK of FIG. 10 are input to the data input and the CLOCK input of the horizontal shift register 902, respectively. As shown in FIG. 10, a long selection pulse, which is many times the CLOCK cycle, is input to $H_{sync}'$. With this, a long integrating time can be set.

For example, when H is set to 250 μsec, an integrating time of about 125 μsec of about ½ of 250 μsec is obtainable. H1, H2, H3, . . . , are the outputs of the horizontal shift register 902. A long selecting period is gradually shifted. With this, the horizontal switch-2 (904) is selected and performs an integrating operation. Vc1, Vc2, Vc3, . . . , are integrated waveforms, and a long integration of 125 μsec is performed in parallel but delayed little by little for reading out a signal.

In this circuit, the second half of the $H_{sync}$ period is used to read out a signal. Read pulses H1', H2', H3', . . . , are input to the horizontal switches-1 (903), respectively. With these pulses, the voltage of each integration circuit is read out by the horizontal signal line 905 and is transferred to the output 906. The sections of H1', H2', H3', indicated by (a) in FIG. 10, are provided so that, while a certain horizontal switch-1 (903) is being selected, reset switch 907 is turned on and that each integration capacitor 908 is reset by a RESET pulse.

In the example of FIG. 9, while only a single reset switch has been arranged, it is also possible to arrange a reset switch in each integration circuit.

In the circuit of FIG. 9, although some of the ideas, indicated in the description of FIG. 1, have been omitted for making the feature of the circuit clear, it is a matter of course that the ideas are also applicable to the circuit of FIG. 9.

In the circuit of FIG. 9, an integration circuit has been arranged in each column. However, since signals are read out, in this structure the integration can not be performed over the entire period of the $H_{sync}$ cycle.

Figure 11:
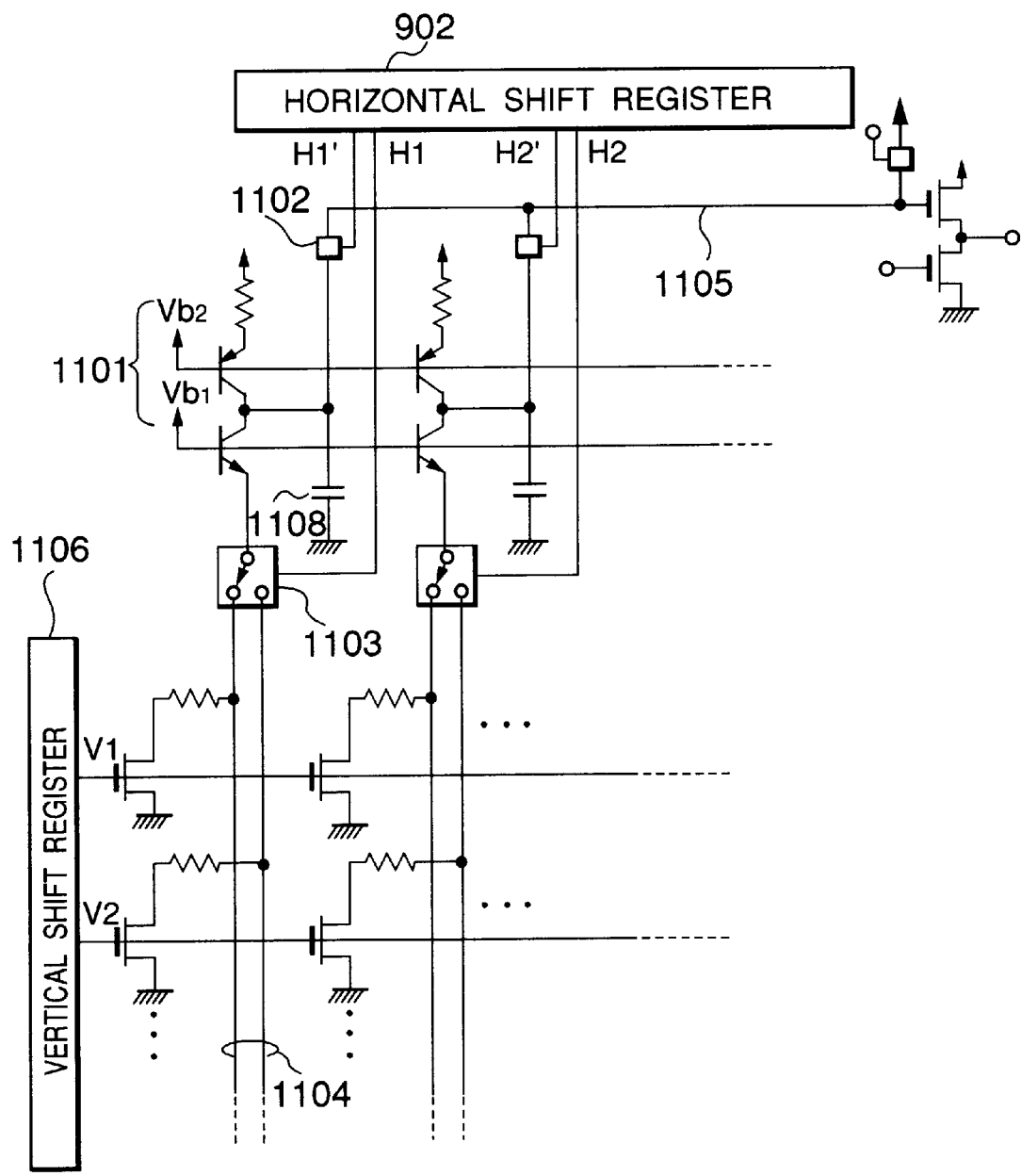
FIG. 11 is a circuit diagram showing a circuit structure example of each section in the third embodiment of the thermal-type infrared imaging device of the present invention.

FIG. 11 is a circuit diagram showing a circuit structure example of each section in the third embodiment of the thermal-type infrared imaging device of the present invention, and shows a circuit example for performing integration over the near entire period of $H_{sync}$.

In the circuit shown in FIG. 11, an integration circuit 1101 is provided in each column, as in the circuit of FIG. 9. However, this example has two vertical signal lines 1104 and a horizontal two-contact switch-2 (1103) for switching the two horizontal signal lines at each column. One of the two contacts of the horizontal switch-2 (1103) is connected to the odd row of the two vertical signal lines 1104, and the other is connected to the even row.

Figure 12:
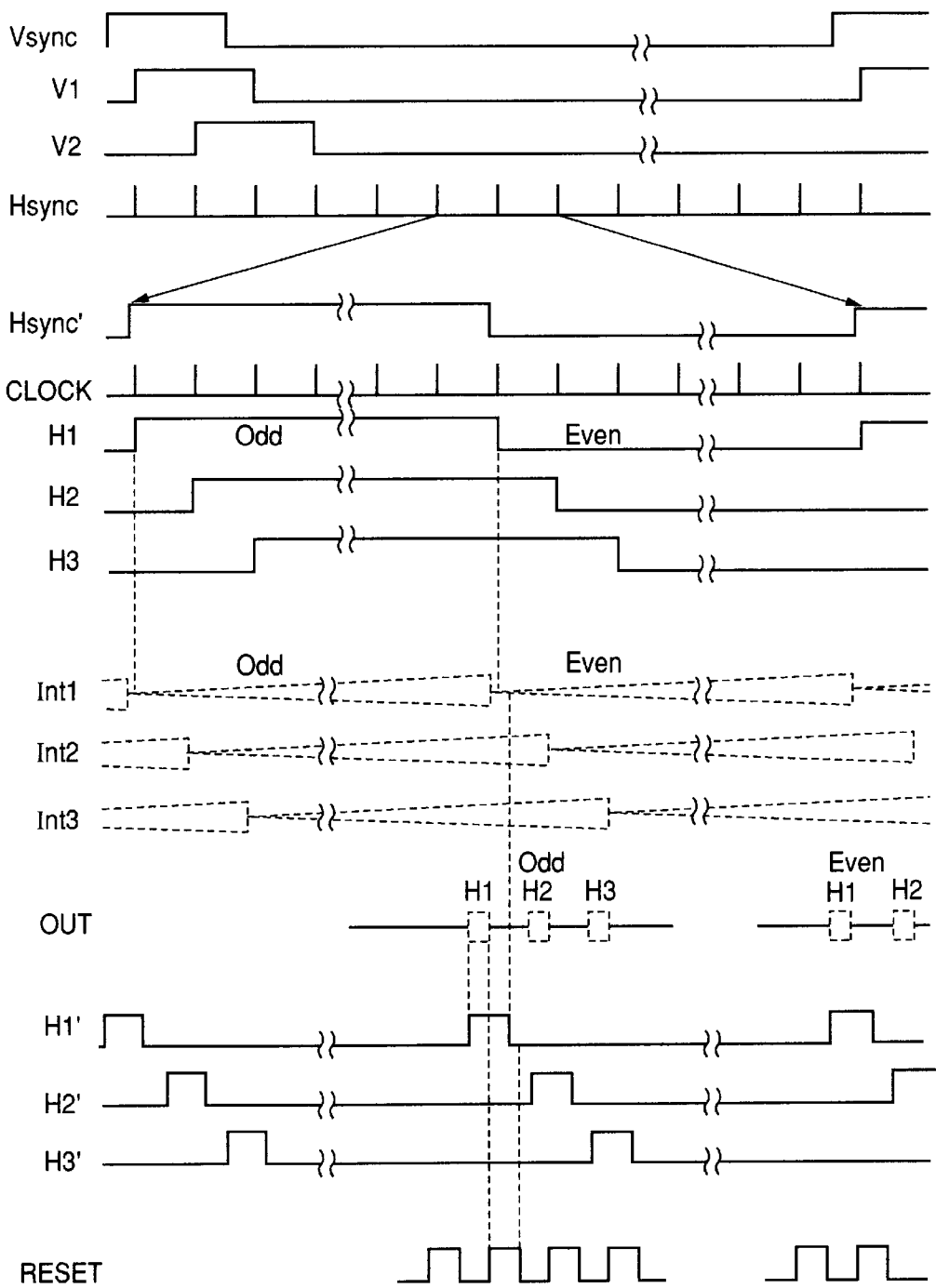
FIG. 12 provides timing diagrams showing the third embodiment of the thermal-type infrared imaging device of the present invention, FIG. 12 being a diagram showing the relation between $V_{sync}$ and $H_{sync}$ and provides being a diagram showing the relation between $H_{sync}$ and $H_{sync}'$.

FIG. 12 is a timing diagram showing the embodiment of the thermal-type infrared imaging device of the present invention, and shows the operating timing of the circuit shown in FIG. 11.

In FIG. 12, the $V_{sync}$ and $H_{sync}$ of FIG. 12 are input to the data input and the CLOCK input of the vertical shift register 1106, respectively. The point differing from other examples is that a pulse with a width extending over two $H_{sync}$ pulses is input as $V_{sync}$ and that selection of each row is performed over two cycles of $H_{sync}$. V1 and V2 are examples of the output of the vertical shift register.

Furthermore, $H_{sync}'$ with a cycle twice $H_{sync}$ and a duty ratio of 50% is input as the data input of the horizontal shift register 1107. The outputs (H1, H2, H3, . . . ) of the horizontal shift register 1107 are input to the two-contact horizontal switches-2 (1103), respectively. For example, when the output level is high, an odd row is selected, and when the output level is low, an even row is selected. Now, consider the integrating operation of an odd row. While the odd row of the H1 column is being selected, the integration circuit 1101 performs an integrating operation and, at the next row, reads a signal immediately before selection is switched to a certain even row.

H1', H2', H3', . . . are pulses for reading out a signal and are input to the horizontal switches-1 (1102). Immediately after the H1' pulse rises and then reads a signal, the RESET pulse rises and then resets the integration capacitor 1108. Even after the H1' pulse rises, the RESET pulse holds a high level for a while and resets the parasitic capacity of the horizontal signal line 1105.

Although the H2 column is also the same as the H1' column, the integration of the next row (e.g., even row) of the H1 column has already been started when the H2 column is read out. Usually, although such cannot be performed, the present invention can perform the integration and the reading at the same time, because it has two vertical signal lines at each column. In the same way, when a certain column is read out, the integration of the even row of a column, positioned before the read column, has already been started. However, the odd row remains selected, so a signal can be read out.

In this way, the structure of the present invention can lengthen the integrating time up to the near entire length of the $H_{sync}$ cycle. For example, when a frame cycle is 33 msec and the number of pixels is 1000×1000, $H_{sync}$ is 33 msec/ 1000=33 μsec. In the present structure, the integrating time can be taken over near 33 μsec. In the case where each column has an integration circuit and a single vertical signal line, it is difficult to increase the integrating time to such a length (because a clock frequency is increased). Furthermore, in the present structure, it is also possible to use the full cycle of $H_{sync}$ for the reading of a signal of each column, and there is no load on the signal reading speed.

Moreover, a structure employing an n-contact switch as the horizontal switch-2 and switching n vertical signal lines is also beneficial depending upon integrating time.

Figure 13:
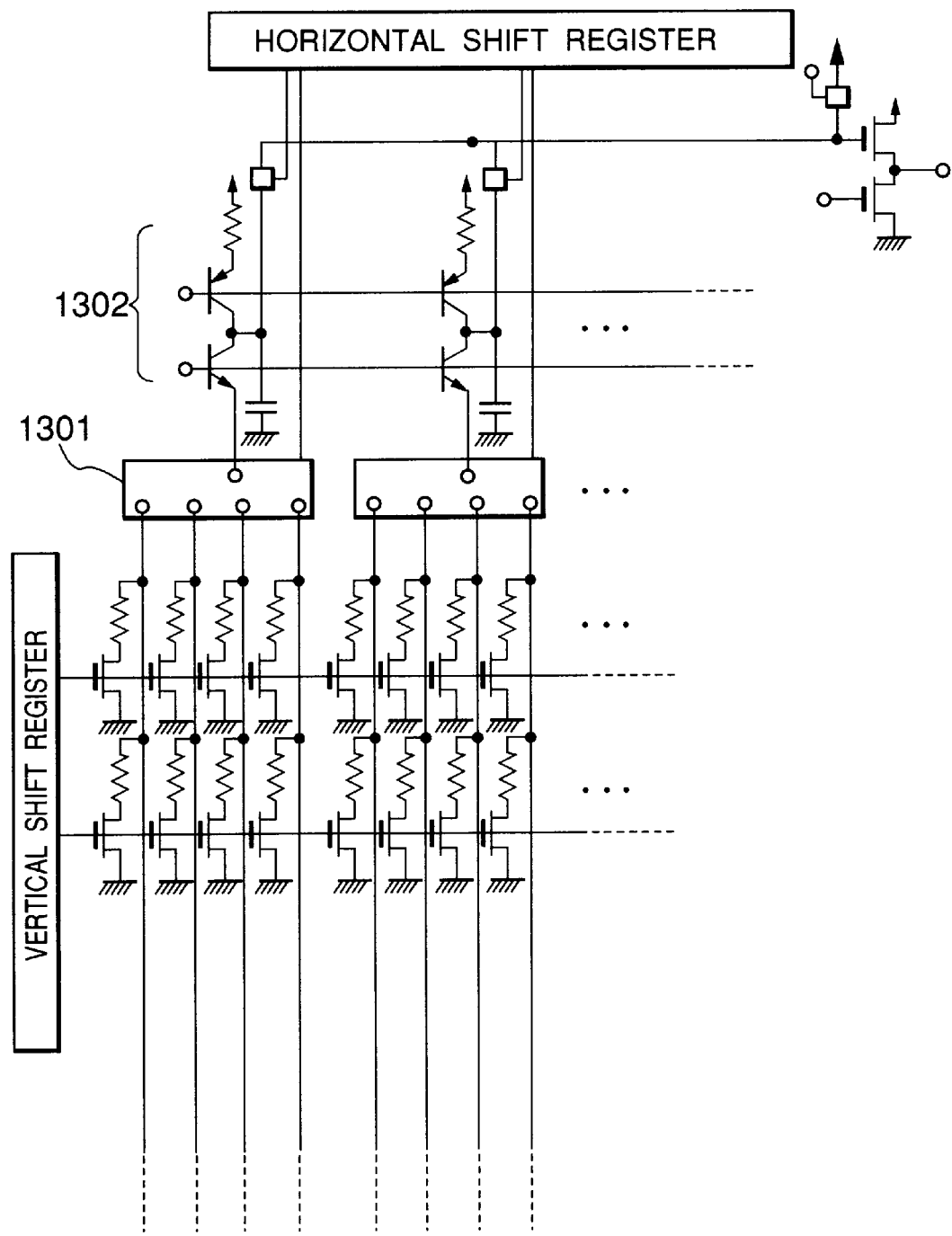
FIG. 13 is a circuit diagram showing a circuit structure example of each section in the fourth embodiment of the thermal-type infrared imaging device of the present invention.

FIG. 13 is a circuit diagram showing a circuit structure example of each section in the fourth embodiment of the thermal-type infrared imaging device of the present invention, and shows the case which employs a 4-contact switch as the horizontal switch-2 (1301) and which switches 4 vertical signal lines.

As shown in FIG. 13, 4 vertical signal lines are connected to respective columns. Even in this case, each integration circuit can perform an integrating operation in parallel but at slightly shifted time. This embodiment is suitable for the case of a medium number of pixels, such as 512×512 pixels. For example, when a four-contact switch is employed with 512×512 pixels and a frame cycle of 33 msec, the integrating time is 33 msec/512/4≐about 16 μsec. The reading of a signal is slightly different from other cases and is performed every n columns. However, rearrangement such as this can be easily performed by an external signal process.

Figure 14:
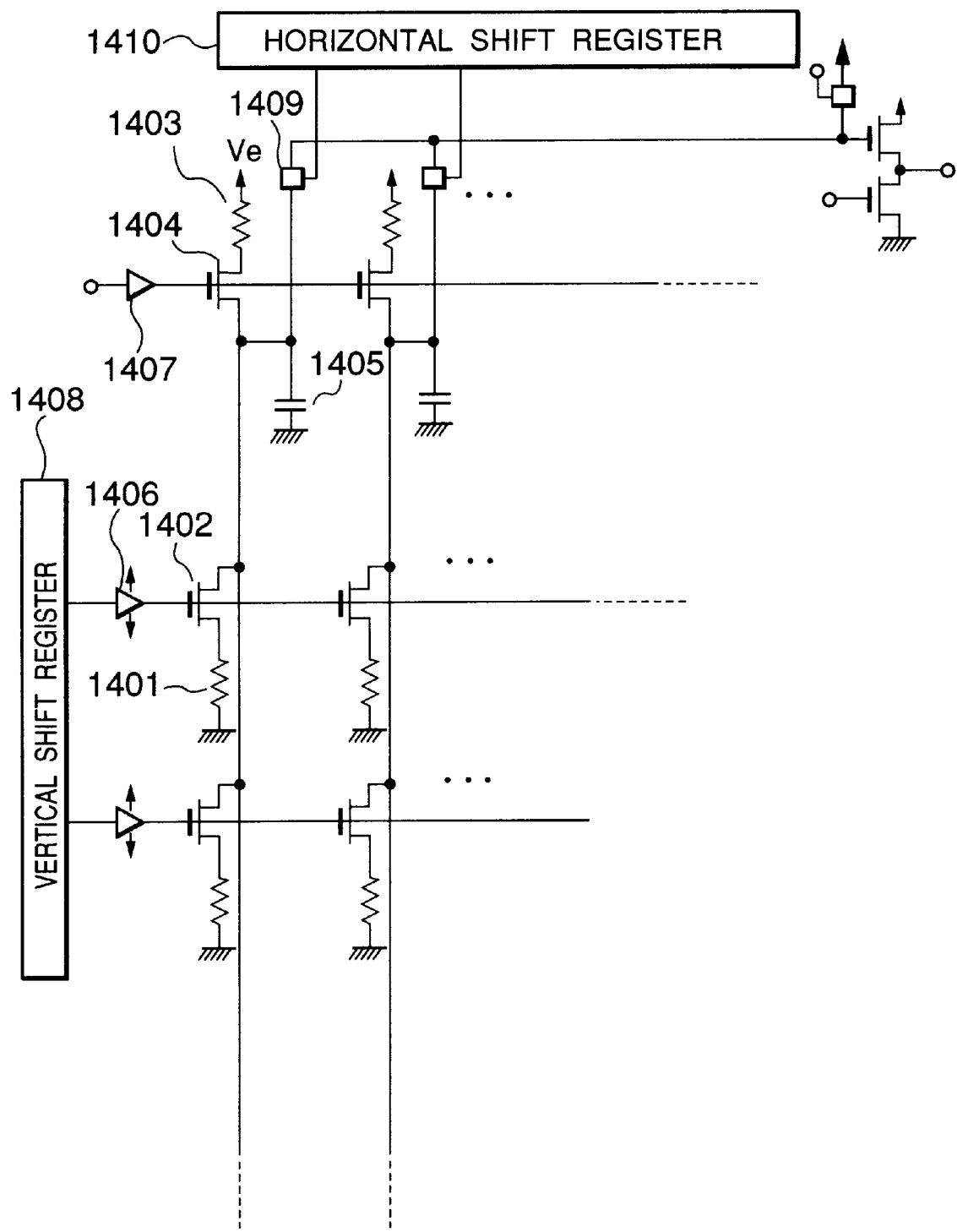
FIG. 14 is a circuit diagram fifth showing a circuit structure example of each section in the embodiment of the thermal-type infrared imaging device of the present invention.

FIG. 14 is a circuit diagram showing a circuit structure example of each section in the fifth embodiment of the thermal-type infrared imaging device of the present invention, and shows an example where a titanium bolometer-1 (1401) (on a diaphragm) and an integration transistor-1 (1402) were arranged in each pixel.

If arranged as shown in FIG. 14, the structure can have both functions of pixel and horizontal switches. In the example of FIG. 14, although MOSFETs have been used, it is a matter of course that bipolar transistors, junction FETs, and other various transistors can be used.

MOSFETs have the advantage that there is almost no current of the gate circuit equivalent to the base current of a bipolar transistor and that the fabrication process becomes simple as compared with a BiCMOS fabrication process.

A level converter-1 (1406) is arranged between the integration transistor-1 (1402) of each pixel and the vertical shift transistor 1408. This level converter is used for converting the level of the vertical shift register 1408 operating at a logic level (e.g., 5 V) to a voltage (e.g., 3.7 V) required of the integration transistor. As an example of the level converter, there is, for example, the circuit shown in FIG. 6A.

In this case, VDD is set, for example, to 5 V. V2 is set, for example, to 3.7 V, and V1 is set, for example, to 0 V. Therefore, when integration is performed, 3.7 V is applied to the gate of the integration transistor-1 (1402). When no integration is performed, the voltage on the gate is 0 V and the drain of the transistor goes to a high impedance state.

A level converter-2 (1407) is provided for a similar purpose. However, in this case it is necessary that a logic level (e.g., 5 V) is converted to both a gate voltage (e.g., 12.3 V) required for the integrating operation of the integration transistor-2 (1404) and a voltage (e.g., 19 V) required for turning on the transistor. As an example of this level converter, there is, for example, the circuit shown in FIG. 6C. In this case, for example, 5 V is applied to VDD. For example, 19 V is applied to V1 and 12.3 V to V2. With this, a logic amplitude of 5 V is converted to 12.3 V and 19 V which are required for the operation of the integration transistor-2 (1404).

As the aforementioned countermeasure for the self-heat generation of the titanium bolometer, a ramp waveform can be input to the integration transistor even in this example. Also, a level converter having a ramp waveform generating function can be used.

FIG. 15 is a circuit diagram showing a circuit structure example of each section in the embodiment of the thermal-type infrared imaging device of the present invention, and shows an example of a level converter having a ramp waveform generating function.

Figure 15A:
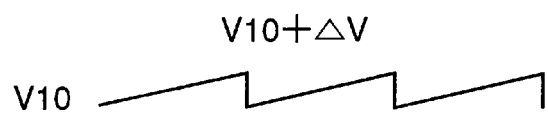
FIGS. 15A–D are circuit diagrams showing a circuit structure example of each section in the embodiment of the thermal-type infrared imaging device of the present invention, FIGS. 15A–B showing a level converter which outputs a ramp waveform of V10 to V10+ΔV, FIG. 15A being a diagram showing an input ramp waveform, FIG. 15B being a diagram showing an input waveform, being a diagram showing a level conversion circuit, and being a diagram showing an output waveform, FIGS. 15C–D showing a level converter which outputs a ramp waveform of V20 to V20–ΔV, FIG. 15C being a diagram showing an input ramp waveform, FIG. 15D being a diagram showing an input waveform, being a diagram showing a level conversion circuit, and being a diagram showing an output waveform.
Figure 15B:
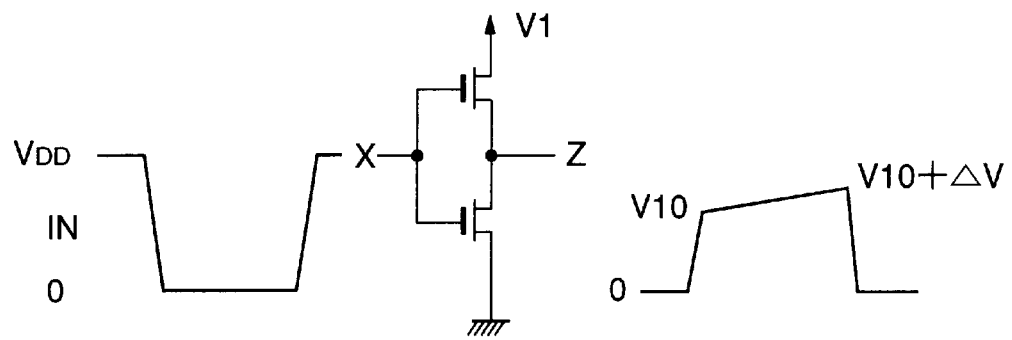
Figure 15C:
Figure 15D:
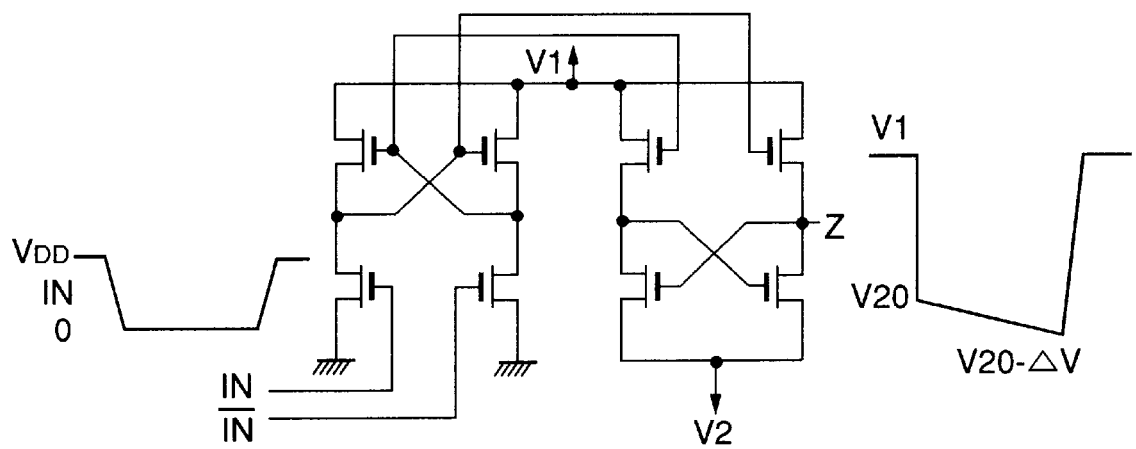

For example, when the level converter-1 (1406) of FIG. 14 is caused to have a ramp waveform generating function, it is necessary that a ramp waveform, which changes linearly between V10 and V10+ΔV, is input to the V1 section in FIGS. 15A–B. Also, when the level converter-2 (1407) of FIG. 14 is caused to have a ramp waveform generating function, it is necessary that a ramp waveform, which changes linearly between V20 and V20+ΔV, is input to the V2 section, as shown in FIGS. 15C–D.

In the example of FIG. 14, it is assumed that the integrating operations of integration circuits are perfectly performed in parallel to one another. In this case, the time between the end of the integrating operation and a read operation varies depending on integration capacitors 1405. In this case it is considered that there occurs a droop phenomenon where the electric charge of the integration capacitor 1405 varies by a leak current.

However, the droop phenomenon can be overcome by making the leak currents of the integration transistor-1 (1402), the integration transistor-2 (1404), the horizontal switch 1410, and the integration capacitor 1405 smaller and also by making the integration capacitor larger. In addition, as in the aforementioned structure examples, integrating intervals can be constructed so as to be in parallel to one another but gradually shifted for reading.

Figure 16:
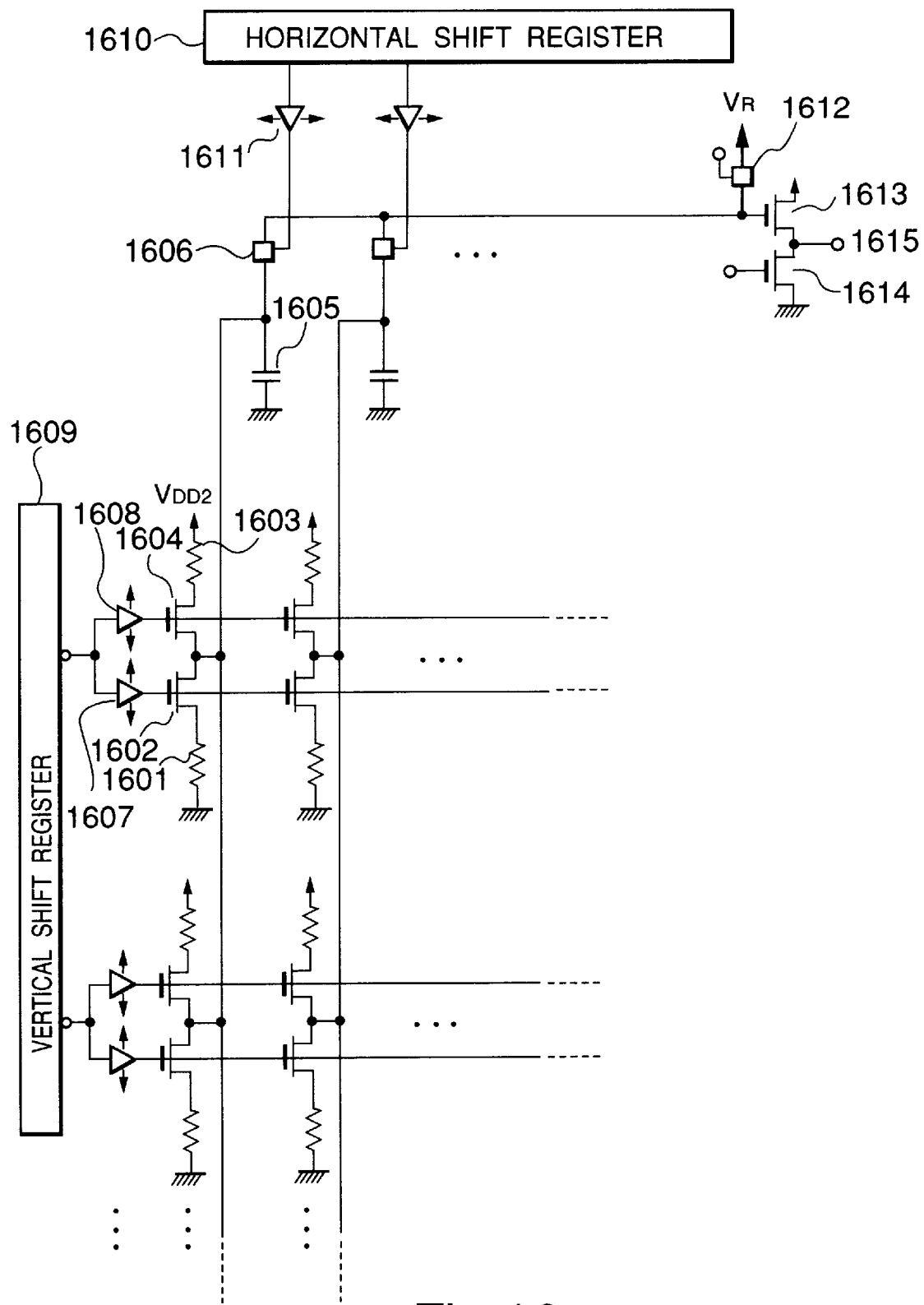
FIG. 16 is a circuit diagram showing a circuit structure example of each section in the sixth embodiment of the thermal-type infrared imaging device of the present invention.

FIG. 16 is a circuit diagram sixth showing a circuit structure example of each section in the embodiment of the thermal-type infrared imaging device of the present invention. A titanium bolometer-1 (1601) and an integration transistor-1 (1602) are arranged in each pixel, and a titanium bolometer-2 (1603) and an integration transistor-2 (1604) are also arranged in each pixel as sane as the FIG. 14.

In FIG. 16, the level converter-1 (1607) and the level converter-2 (1608), described in FIG. 15, are arranged between the integration transistor of each pixel and a vertical shift register 1609.

In titanium bolometers, particularly when the number of pixels is large and the area of a pixel region is large, there are cases where the fluctuation in the resistance values between pixels will be problematic. Since the titanium bolometer-1 and the titanium bolometer-2 are used for the purpose of filtering out a bias component, it is important to make a ratio of resistance value between the two bolometers as even as possible within a plane.

In the structure where only a single titanium bolometer-2 is arranged in each column, a difference of ratio will arise between a pixel in the upper portion of a column and a pixel in the lower portion. On the other hand, by arranging the titanium bolometer-1 and the titanium bolometer-2 in each pixel, a fluctuation in the ratio within a plane can be minimized. Usually, the titanium bolometer-1 is formed on a diaphragm and the titanium bolometer-2 is formed on a substrate. However, in this example it is possible to form the titanium bolometer-2 on another diaphragm.

In order to correct the aforementioned fluctuation of the titanium bolometer within a plane, the present invention has proposed a structure where a non-volatile storage device for correction is arranged. Such a non-volatile storage device can use either a MOSFET provided with a floating gate between a semiconductor substrate surface and a normal gate, a MNOSFET employing many silicon nitride films, having trap order, as a gate insulating film, or a MFSFET employing a ferroelectric material as a gate insulating film.

Figure 17:
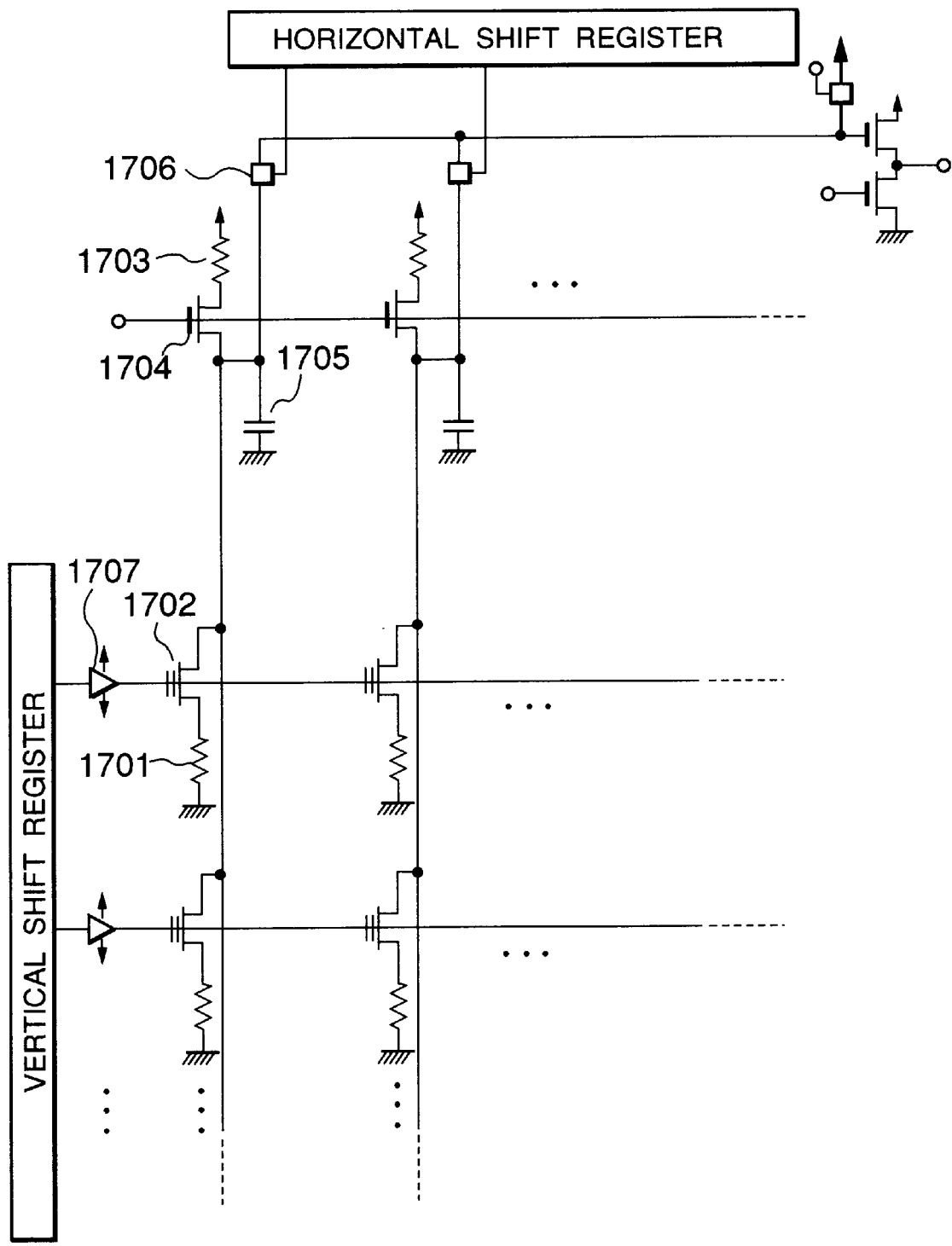
FIG. 17 is a circuit diagram (9) showing a circuit structure example of each section in the seventh embodiment of the thermal-type infrared imaging device of the present invention.

FIG. 17 is a circuit diagram showing a circuit structure example of each section in the seventh embodiment of the thermal-type infrared imaging device of the present invention, and shows an example where a MOSFET with a floating gate was arranged in each pixel.

As shown in FIG. 17, this structure, in addition to a floating-gate MOSFET 1702, is provided with a titanium bolometer-1 (1701), a titanium bolometer-2 (1703), an integration transistor-2 (1704), and an integration capacitor 1705, and a horizontal switch 1706, as in other examples.

The floating-gate MOSFET 1702 of each pixel varies its threshold voltage Vt in correspondence with the fluctuation quantity of a bias current flowing through the titanium bolometer-1 (1701), the titanium bolometer-2 (1703), or the integration transistor, or the fluctuation quantity of a bias charge quantity existing in the integration capacitor 1705. This fluctuation reflects the resistance, leak current, parasitic capacity, and other characteristic fluctuations of the titanium bolometer-1, the titanium bolometer-2, the integration transistor, and the integration capacitor.

If an integrating voltage, which is applied to the gate of the floating-gate MOSFET 1702, is taken to be Vb1, current Ic1 flowing through the drain will be nearly expressed by Ic1=(Vb1−Vt)/Rb1. By varying the Vt, the Rb1 and other fluctuations of each pixel can be corrected.

Figures 18A, 18B:
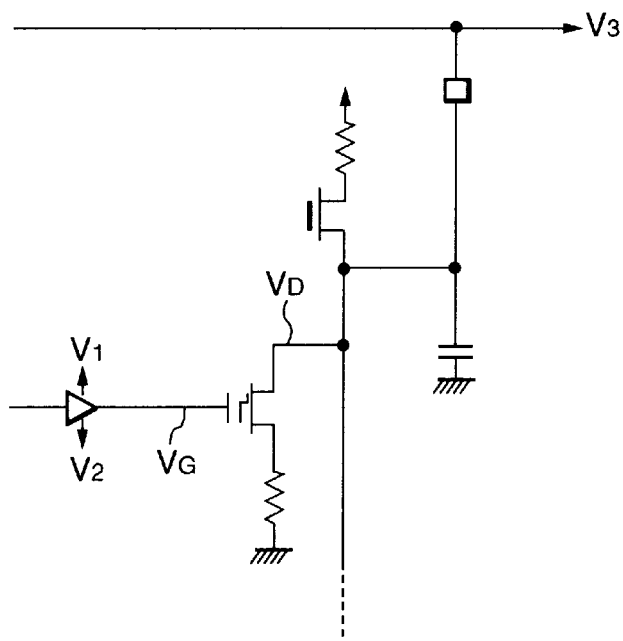
FIGS. 18A–B are circuit diagrams showing the operation of the thermal-type infrared imaging device of the present invention, FIG. 18A being a diagram showing a circuit which performs a read and write operation with respect to non-volatile memory and FIG. 18B being a table showing an operation example.
Figure 19:
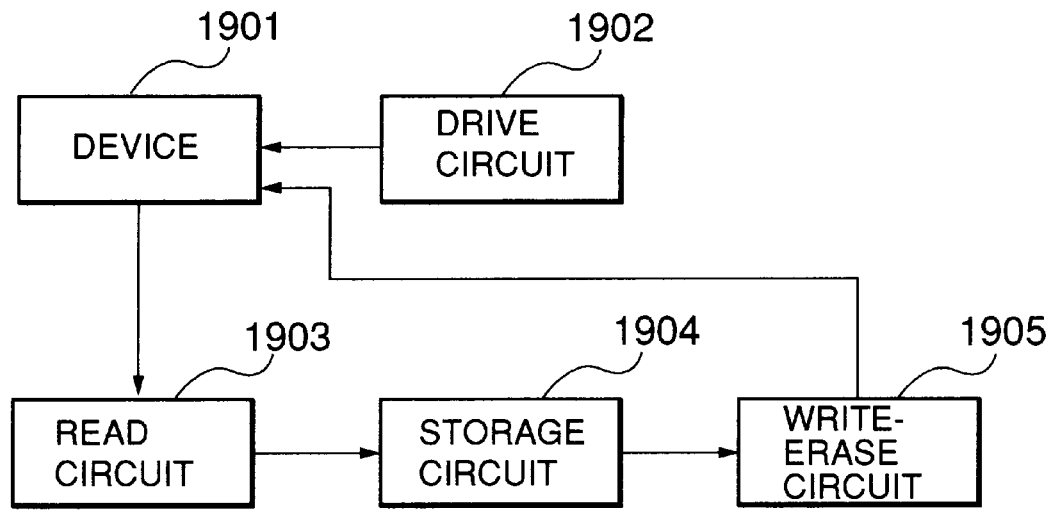
FIG. 19 is a block diagram showing the embodiment of the thermal-type infrared imaging device of the present invention.

FIG. 18 is a circuit diagram showing the operation of the thermal-type infrared imaging device of the present invention, and shows an example of the write, erase, and read sequences of the non-volatile storage device. FIG. 19 is a block diagram showing the embodiment of the thermal-type infrared imaging device of the present invention, and shows a block diagram corresponding to FIG. 18.

In FIG. 19, this embodiment is constituted by a device 1901 having a structure such as that shown in FIG. 17, a drive circuit 1902 for supplying timing to a shift register, a read circuit 1903 for reading and processing a signal, a storage circuit 1904, and a write-erase circuit 1905.

Such a structure may be provided in the imaging device. Alternatively, the storage circuit 1904, the write-erase circuit 1905 may be provided in an adjustment device that is used for initialization, and the imaging device may have only other circuits required for reading out a signal.

In FIG. 17, the level converter 1707 is a level converter which can generate various voltages. For example, the level converter is set to an erase voltage such as that shown in FIG. 18 and performs the initialization of Vt of each non-volatile storage device. Thereafter, reading of each pixel is performed by a normal reading method, and the fluctuation quantity of each pixel at the initialization is stored in an external storage circuit.

In correspondence with the fluctuation quantity, writing to each non-volatile storage device is performed so that fluctuation is diminished, and Vt is varied. For data writing, the device is set, for example, to a write voltage shown in FIG. 18 to give rise to avalanche breakdown, and electric charge is injected into the floating gate to vary Vt. By varying the application time of this write voltage, a quantity of charge to be injected can be varied. Data reading can be performed as described in other structure examples.

Figure 20:
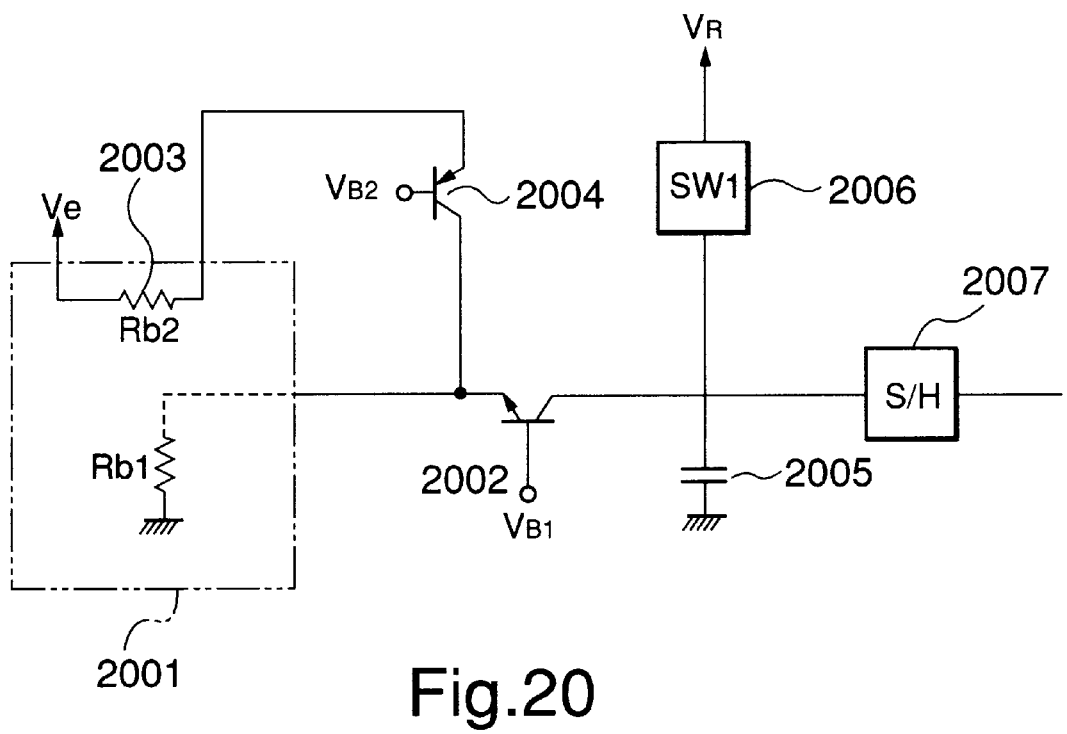
FIG. 20 is a circuit diagram (10) showing a circuit structure example of each section in the embodiment of the thermal-type infrared imaging device of the present invention.
Figure 21:
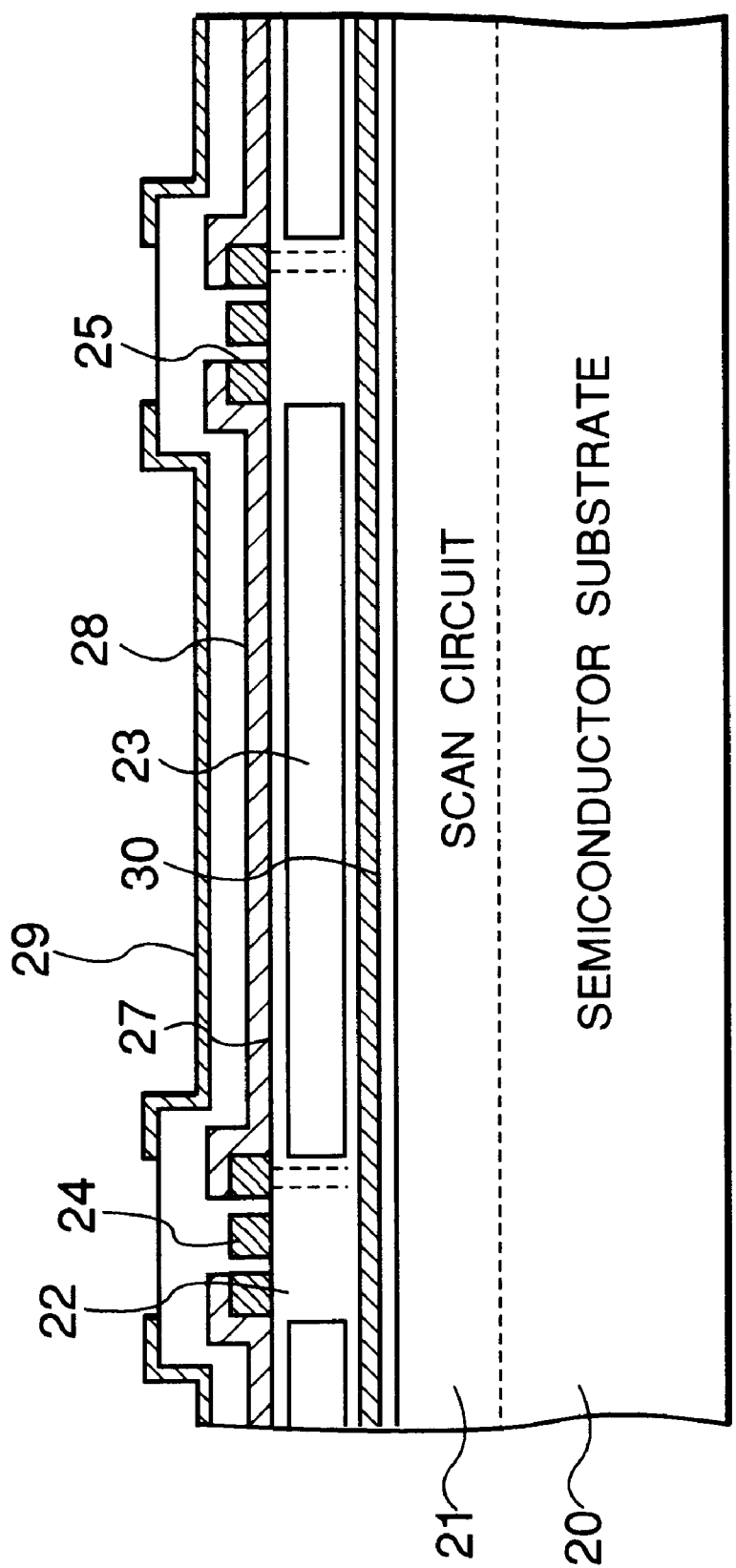
FIG. 21 is a sectional view of a conventional thermal-type infrared imaging device.
Figure 22:
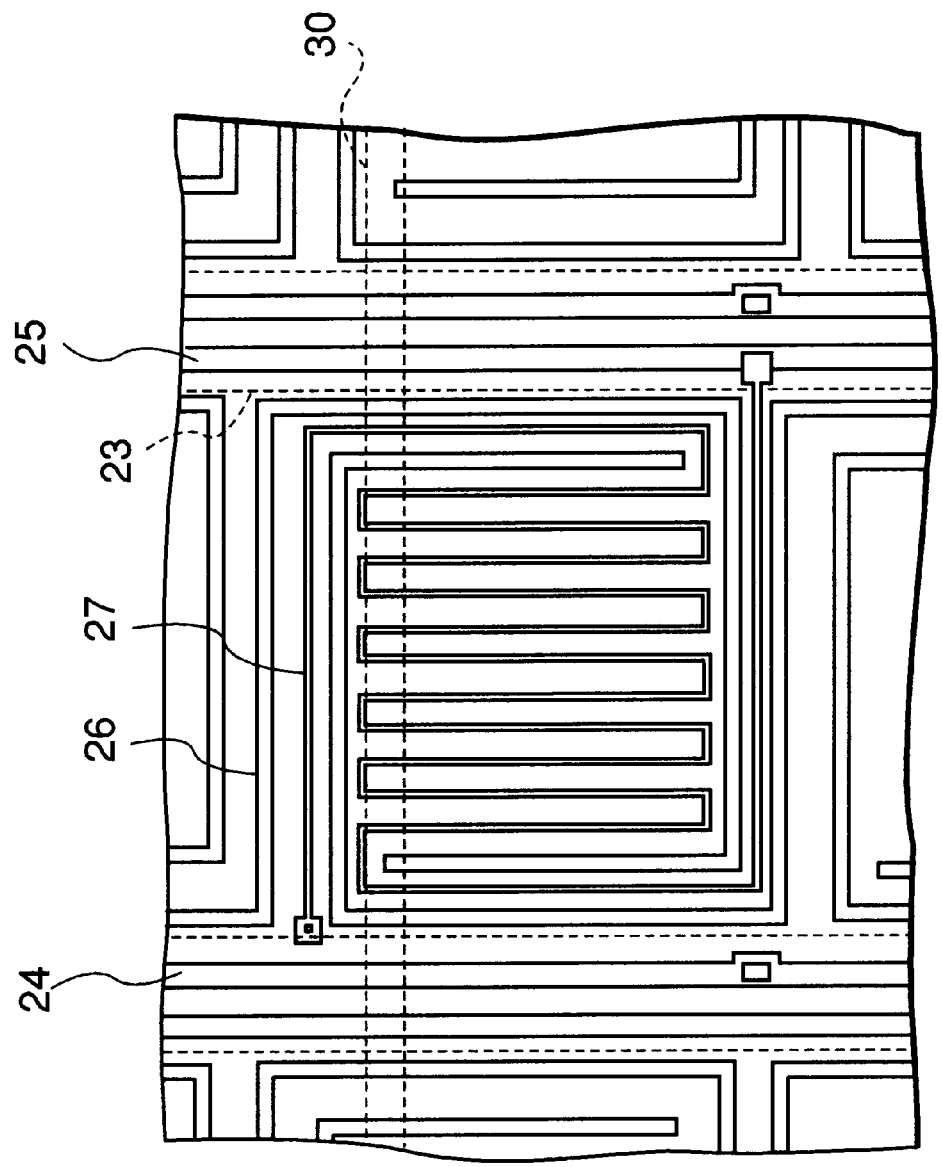
FIG. 22 is a plan view of the conventional thermal-type infrared imaging device.
Figure 23:
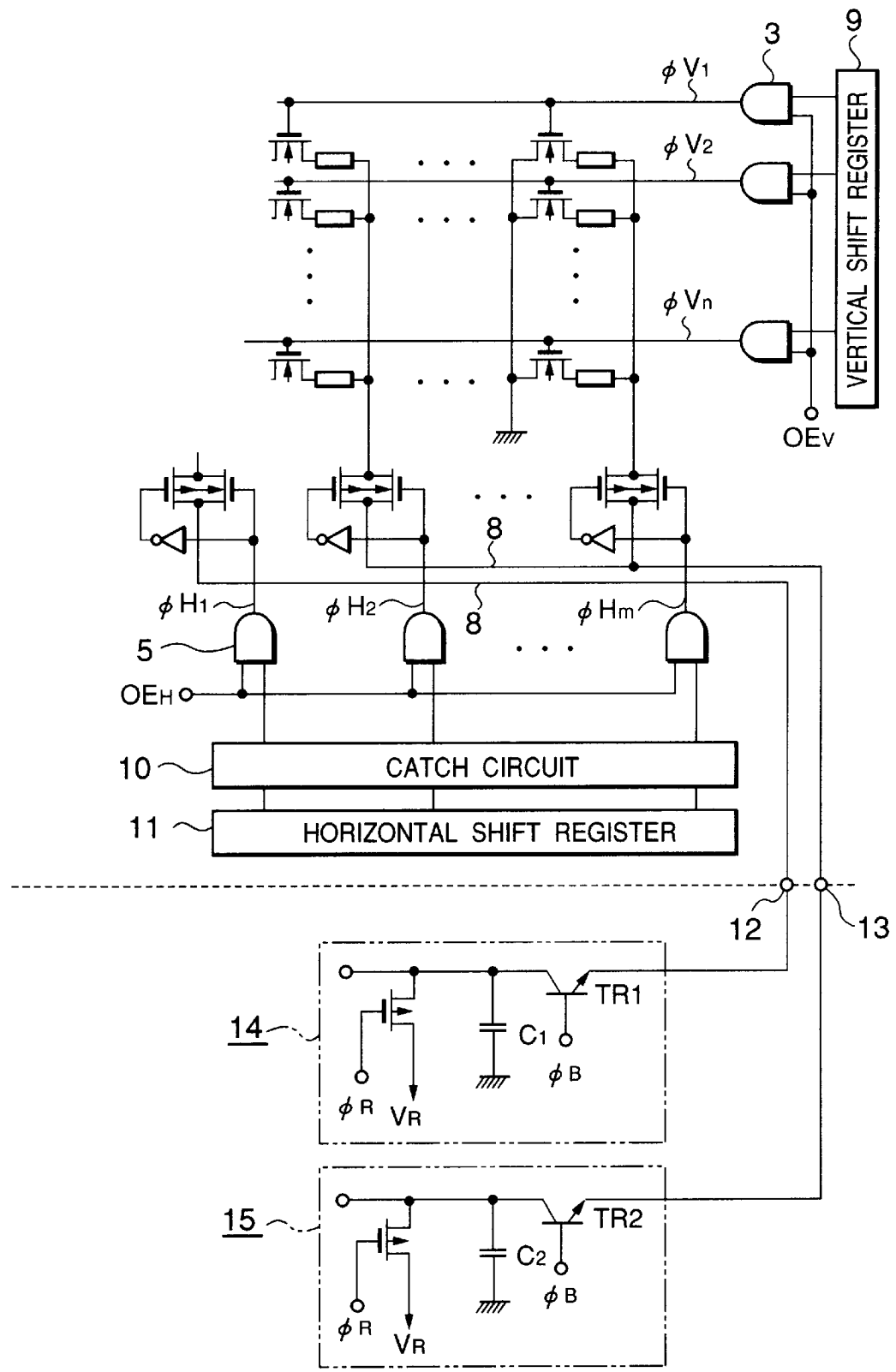
FIG. 23 shows a circuit diagram of the conventional thermal-type infrared imaging device.

FIG. 20 is a circuit diagram showing a circuit structure example of each section in the embodiment of the thermal-type infrared imaging device of the present invention, and shows an example where an integration circuit was provided outside the device.

The example shown in FIG. 20 is effective when the number of pixels is very small, like 64×64 pixels. The structure shown in FIG. 20 is provided, for example, with a device 2001 with titanium bolometers-1 arranged in the form of a matrix, an integration transistor-1 (2002), a titanium bolometer-2 (2003), an integration transistor 2004, an integration capacitor 2005, a reset switch 2006, and a sample-hold section (S/H) (2007).

If the titanium bolometer-2 (2003) is arranged on the device 2001, it will thermally match the titanium bolometer-1 arranged on the device 2001 and therefore temperature drift can be alleviated. If temperature drift is small, an external of device 2001, common resistor can be used instead of the titanium bolometer-2 (2003).

While the foregoing description has been made of the case where integration circuits, such as integration capacitors, are arranged on the column side, the line on the row side and the line on the column side are exchangeable as the occasion may demand.

According to the present invention, as previously described, the thermal-type infrared imaging device can filter out the large part of a bias current which is an obstacle in performing an integrating operation by a limited integration capacity. Also, the thermal-type infrared imaging device can achieve a further increase in the bias current by a reduction in the integration capacity or the same integration capacity. In this case, since the S/N ratio is proportional to a bias current, the S/N ratio can be enhanced. In addition, since the gain of an integration circuit can be raised by making an integration capacity smaller, a signal level in the device output section can be made larger and the noise influence of the device to an external circuit can be reduced.

In addition, in the present invention the titanium bolometer 2 has been used as the resistor Rb2 for filtering out the bias current of the measurement titanium bolometer-1, and consequently, a phenomenon going out of a dynamic range can be suppressed based on the temperature change of the device.

Furthermore, the present invention can minimize the influence of noise existing in integration transistors and compensation titanium bolometers-2 by the structure of a thermo-electric converting element connected to an emitter or a source and also by increasing the resistance value of the bias current compensation titanium bolometer-2 to 1.5 to 10 times the resistance value of the measurement titanium bolometer-1.

In the present invention, a single integration capacitor is provided in each column or a plurality of columns of pixels. The integrating operations of integration capacitors are performed in parallel but at slightly shifted times. Furthermore, a third shift register for selecting an integration capacitor is provided. Accordingly, optimum integrating operation and signal reading can be performed.

In the present invention, the compensation titanium bolometer-2 is formed on a semiconductor substrate and there is provided a ramp waveform generator. Therefore, a phenomenon going out of a dynamic range can be suppressed by the heat generation of the bolometer itself.

Moreover, the present invention is provided with a level converter which converts a logic level signal to a level required for integration operation and signal reading. With this arrangement, an enhancement in a bias current and an enlargement in a dynamic range are achievable.

Finally, in the present invention, a measurement titanium bolometer-1 and a compensation titanium bolometer-2 are arranged in each pixel. Also, there is provided a nonvolatile storage device which stores data for varying a threshold voltage Vt in correspondence with a fluctuation in each pixel. Consequently, a fluctuation between pixels can be reduced, and an external fluctuation correction circuit can be made structurally simpler or omitted.

While the invention has been described with reference to preferred embodiments thereof, the invention is not to be limited to the details given herein, but may be modified within the scope of the appended claims.

What is claimed is:

1. A thermal-type infrared imaging device comprising:
    a first thermo-electric converting element for generating an electric signal which corresponds to temperature determined according to heat generated by absorbing an incident infrared ray, said first thermo-electric converting element being coupled to a first power source line;
    a first transistor connected between said first thermo-electric converting element and a node;
    a resistor;
    a second transistor connected between said resistor and said node; and
    an integration capacitor connected between said node and a second power source line.

2. The device as claimed in claim 1, wherein said first transistor is a first bipolar transistor having a first emitter connected to said resistor and a first collector connected to said node and said second transistor is a second bipolar transistor having a second emitter connected to said resistor and a second collector connected to said node.

3. The device as set forth in claim 2, wherein values of currents flowing through the respective collectors of said first and second bipolar transistors are nearly equal to each other.

4. The device as claimed in claim 1, wherein said first transistor is a first MOS transistor having a first source connected to said resistor and a first drain connected to said node and said second transistor is a second MOS transistor having a second source connected to said thermo-electric converting element and a second drain connected to said node.

5. The device as claimed in claim 1, wherein a value of said resistor is 1.5 to 10 times the resistance value of said first thermo-electric converting element.

6. The device as claimed in claim 1, wherein said resistor is a second thermo-electric converting element whose temperature does not change by heat generated by absorbing an incident infrared ray and the respective thermal coefficients of said second and first thermo-electric converting elements are nearly equal to each other.

7. The device as claimed in claim 6, wherein a thermal isolating structure section is provided on a semiconductor substrate for blocking heat radiation, said first thermo-electric converting element is provided in said thermal isolating structure section, and said second thermo-electric converting element is provided in said semiconductor substrate other than said thermal isolating structure section.

8. The device as claimed in claim 6, wherein said first transistor is a MOS field-effect transistor having a floating gate.

9. The device as claimed in claim 8, wherein said MOS field-effect transistor varies its threshold voltage in correspondence with information from said integration capacitor, whereby a fluctuation in a ratio of resistances of said first and second thermo-electric converting elements is corrected.

10. A thermal-type imaging device comprising:
    a plurality of first thermo-electric converting elements arranged in the form of a two-dimensional matrix, each generating an electric signal which corresponds to a temperature determined according to heat generated by absorbing an incident infrared ray, each having a first end and a second end, said second end being coupled to a power source line;
    a plurality of first bipolar transistors each connected between said first thermo-electric converting element and a node;
    a plurality of resistors;
    a plurality of second transistors each connected between said resistor and said node; and
    a plurality of integration capacitors arranged in each line or a plurality of lines of said two-dimensional matrix, each integration capacitor having a first electrode connected to said node and a second electrode coupled to said power source line.

11. The device as claimed in claim 10, wherein integration operation in each said integration capacitors is performed at the same time.

12. The device as claimed in claim 10, wherein integration operation in each said integration capacitors is performed sequentially.

13. The device as claimed in claim 10, wherein integration operation and read operation of integration value produced by said integration operation of each integration capacitors is performed at the same time.

14. The device as claimed in claim 10, wherein read operation of integration value produced by an integration operation of each integration capacitors is performed sequentially.

15. The device as claimed in claim 10, wherein further comprises, a first shift register;

a plurality of first switches controlled an electronical connection/disconnection between said first thermo-electric converting element and said node in response to first information from said first shift register;

a second shift register; and a plurality of second switches selecting the respective integration capacitor in response to second information from said second shift register.

16. The device as claimed in claim 10, wherein a ramp waveform generator is connected to a control electrode of said second transistor.

17. The device as claimed in claim 16, wherein said ramp waveform generator comprises;

a ramp generation resistor;

a ramp generation transistor connected between said resistor and a second node; and a ramp generation capacitor connected to said second node.

18. A thermal-type imaging device comprising:

a plurality of first thermo-electric converting elements arranged in the form of a two-dimensional matrix for each pixel, said first thermo-electric converting elements generating an electric signal which corresponds to temperature determined according to heat generated by absorbing an incident infrared ray, each of said first thermo-electric converting elements being coupled to a first power source line;

a shift register outputting a selecting signal;

a transistor for selecting at least one of said first thermo-electric converting elements in response to said selecting signal; and a level converter converting said selecting signal to a level which drives said transistor;

a plurality of first bipolar transistors each connected between the respective first thermo-electric converting element and a corresponding one of nodes;

a plurality of second thermo-electric converting elements which are insensitive to incident infrared rays;

a plurality of second transistors each connected between a corresponding one of said second thermo-electric converting elements and a corresponding one of said nodes such that a current flowing through said first transistor is substantially equal to a current flowing through said the respective second transistor when said incident infrared ray is blocked; and a plurality of integration capacitors arranged in each line or a plurality of lines of said two-dimensional matrix, each integration capacitor coupled between a corresponding one of said nodes and a second power source line.

19. A thermal-type infrared imaging device comprising:

a first thermo-electric converting element which generates an electric signal corresponding to a temperature determined according to heat generated by absorbing an incident infrared ray, said first thermo-electric converting element being coupled to a node; and a constant current source circuit coupled to said node and which supplies a current produced thereof to said first thermo-electric converting element to cancel a current flowing through said first thermo-electric converting element when said incident infrared ray is blocked against said first thermo-electric converting element.

20. The device as claimed in claim 19, wherein a current flowing through said constant current source circuit is substantially equal to a current flowing through said first thermo-electric converting element when said incident infrared ray is blocked.

21. The device as claimed in claim 20, wherein said constant current source circuit comprises a second thermo-electric converting element which is insensitive to incident infrared rays and a first transistor having a first control gate supplied to a first constant voltage and a current path between said node and said second thermo-electric converting element.

22. The device as claimed in claim 21, said device further comprising:

a capacitor coupled between said node and a first power source line;

a second transistor coupled between said node and said first thermo-electric converting element and having a second control gate supplied to a second constant voltage;

a third transistor coupled between said first thermo-electric converting element and said first power source line.

23. The device as claimed in claim 21, said device further comprising a ramp waveform generator connected to said first control gate of said first transistor.

24. A thermo-type infrared imaging device comprising:

a first thermo-electric converting element for generating an electric signal which corresponds to a temperature determined according to heat generated by absorbing an incident infrared ray;

a first transistor connected between said first thermo-electric converting element and a node;

a resistor;

a second transistor connected between said resistor and said node; and an integration capacitor connected to said node, said first transistor being a first bipolar transistor having a first emitter connected to said resistor and a first collector connected to said node and said second transistor being a second bipolar transistor having a second emitter connected to said resistor and a second collector connected to said node, wherein values of currents flowing through the respective collectors of said first and second bipolar transistors are nearly equal to each other.

25. A thermal-type imaging device comprising:

a plurality of first thermo-electric converting elements arranged in the form of a two-dimensional matrix, each generating an electric signal which corresponds to a temperature determined according to heat generated by absorbing an incident infrared ray, each having a first end and a second end, said second end being coupled to a power source line;

a plurality of first bipolar transistors each connected between said first thermo-electric converting element and a node;

a plurality of resistors;

a plurality of second transistors each connected between said resistor and said node; and a plurality of integration capacitors arranged in each line or a plurality of lines of said two-dimensional matrix, each integration capacitor having a first electrode connected to said node and a second electrode coupled to said power source line, wherein a ramp waveform generator is connected to a control electrode of said second transistor.

\* \* \* \* \*